(12) United States Patent
Rundo et al.

(10) Patent No.: US 12,548,142 B2
(45) Date of Patent: Feb. 10, 2026

(54) MACHINE LEARNING TECHNIQUES FOR WAFER DEFECT MAP CLASSIFICATION

(71) Applicant: STMicroelectronics International N.V., Geneva (CH)

(72) Inventors: Francesco Rundo, Gravina di Catania (IT); Salvatore Coffa, Milan (IT); Riccardo Emanuele Sarpietro, Paternò (IT); Concetto Spampinato, Catania (IT); Paola Carmelina Giuffre', Valverde (IT); Giuseppe Randazzo, Catania (IT); Marco Stefano Scroppo, Catania (IT); Daniele Riccardo Vinciguerra, Catania (IT)

(73) Assignee: STMicroelectronics International N.V., Geneva (CH)

( * ) Notice: Subject to any disclaimer, the term of this patent is extended or adjusted under 35 U.S.C. 154(b) by 448 days.

(21) Appl. No.: 18/068,944

(22) Filed: Dec. 20, 2022

(65) Prior Publication Data
US 2024/0202908 A1 Jun. 20, 2024

(51) Int. Cl.
*G06T 7/00* (2017.01)
*G06V 10/74* (2022.01)
(Continued)

(52) U.S. Cl.
CPC ............ *G06T 7/001* (2013.01); *G06V 10/761* (2022.01); *G06V 10/762* (2022.01);
(Continued)

(58) Field of Classification Search
CPC ...... G06T 7/001; G06V 20/70; G06V 10/762; G06V 10/7715; G06V 10/761; G06V 10/764
See application file for complete search history.

(56) References Cited

U.S. PATENT DOCUMENTS 10,922,807 B2 2/2021 Moioli et al.
2021/0209410 A1* 7/2021 Pan ..................... G01N 21/9501
(Continued)

OTHER PUBLICATIONS

Li, K. S. M., Jiang, X. H., Chen, L. L. Y., Wang, S. J., Huang, A. Y. A., Chen, J. E., . . . & Hsu, C. L. (2022). Wafer defect pattern labeling and recognition using semi-supervised learning. IEEE Transactions on Semiconductor Manufacturing, 35(2), 291-299. ( Year: 2022).*

(Continued)

*Primary Examiner* — David Perlman
(74) *Attorney, Agent, or Firm* — Alston & Bird LLP

(57) ABSTRACT

Various embodiments of the present disclosure provide methods, apparatus, systems, computing devices, computing entities for generating classification predictions for wafer defect maps. Reduced feature data may be generated, using a non-linear dimensionality reduction machine learning model and based at least in part on vector representations for a set of wafer defect map images. One or more wafer defect pattern clusters may be generated, using a density-based clustering machine learning model and based at least in part on the reduced feature data. Each wafer defect map image may be associated with a particular wafer defect pattern cluster of the one or more wafer defect pattern clusters. A classification prediction may be generated for each wafer defect map image based at least in part on the particular wafer defect pattern cluster associated with the respective wafer defect map image.

18 Claims, 18 Drawing Sheets

(51) Int. Cl.
G06V 10/762 (2022.01)
G06V 10/764 (2022.01)
G06V 10/77 (2022.01)
G06V 10/774 (2022.01)
G06V 10/82 (2022.01)
G06V 20/70 (2022.01)

(52) U.S. Cl.
CPC ........ *G06V 10/764* (2022.01); *G06V 10/7715* (2022.01); *G06V 20/70* (2022.01); *G06T 2207/20081* (2013.01); *G06T 2207/20084* (2013.01); *G06T 2207/30148* (2013.01); *G06V 10/774* (2022.01); *G06V 10/82* (2022.01)

(56) References Cited

U.S. PATENT DOCUMENTS

| | | | |
|---|---|---|---|
| 2022/0253641 A1* | 8/2022 | Chung | G06F 18/2413 |
| 2023/0316103 A1* | 10/2023 | Bastani | G03F 7/705 |
| | | | 706/12 |
| 2024/0294465 A1* | 9/2024 | Burgstaller | C07D 213/75 |

OTHER PUBLICATIONS

Shan, C., Wahba, A., Wang, L. C., & Sumikawa, N. (Nov. 2019). Deploying a machine learning solution as a surrogate. In 2019 IEEE International Test Conference (ITC) (pp. 1-10). IEEE. (Year: 2019).*

Bruno, G., Vinciguerra, D., & Gallo, G. (2022). Semisupervised Classification of Anomalies Signatures in Electrical Wafer Sorting ( EWS) Maps. (Year: 2020).*

Sarpietro et al., "Explainable Deep Learning System for Advanced Silicon and Silicon Carbide Electrical Wafer Defect Map Assessment," IEEE Access, 99102-99128, vol. 10, (Sep. 2022).

Sarpietro, "Beyond Wafer Maps: an Artificial Intelligence tool for supervised and unsupervised pattern recognition," Master Thesis, University of Catania, Department of Economics and Business, Academic Year 2020-2021.

Viagrande et al., "Semisupervised Classification of Anomalies Signatures in Electrical Wafer Sorting (EWS) Maps," In Proceedings of the 15th International Joint Conference on Computer Vision, Imaging and Computer Graphics Theory and Applications (VISIGRAPP 2020)—vol. 5: VISAPP, pp. 278-285.

Huang et al., "TestDNA: Novel Wafer Defect Signature for Diagnosis and Yield Learning," 2019 IEEE International Test Conference (ITC), 2019, pp. 1-6, doi: 10.1109/ITC44170.2019.9000166.

Li et al., "TestDNA: Novel Wafer Defect Signature for Diagnosis and Pattern Recognition," in IEEE Transactions on Semiconductor Manufacturing, vol. 33, No. 3, pp. 383-390, Aug. 2020, doi: 10.1109/TSM.2020.2992927.

Ji et al., "Using GAN to Improve CNN Performance of Wafer Map Defect Type Classification : Yield Enhancement," 2020 31st Annual SEMI Advanced Semiconductor Manufacturing Conference (ASMC), 2020, pp. 1-6, doi: 10.1109/ASMC49169.2020.9185193.

Shen et al., "Wafer Map Defect Recognition Based on Deep Transfer Learning," 2019 IEEE International Conference on Industrial Engineering and Engineering Management (IEEM), 2019, pp. 1568-1572, doi: 10.1109/IEEM44572.2019.8978568.

Li et al., "Automatic Inspection for Wafer Defect Pattern Recognition with Unsupervised Clustering," 2021 IEEE European Test Symposium (ETS), 2021, pp. 1-2, doi: 10.1109/ETS50041.2021.9465457.

* cited by examiner

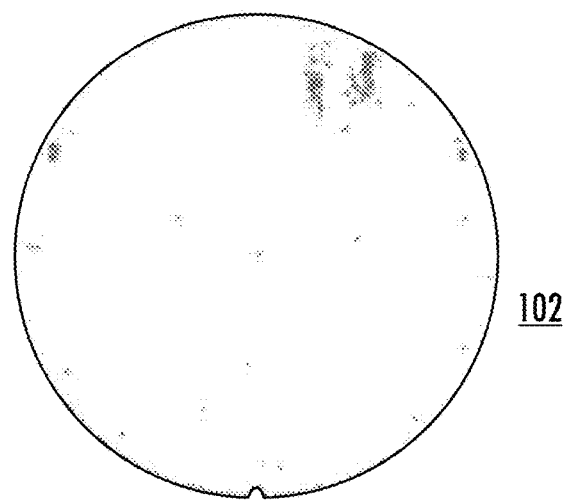
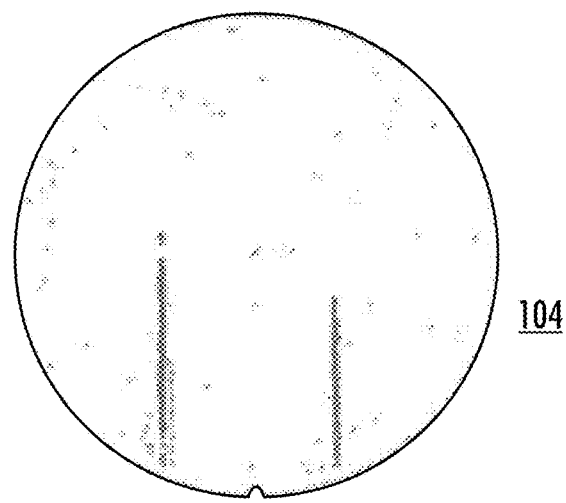
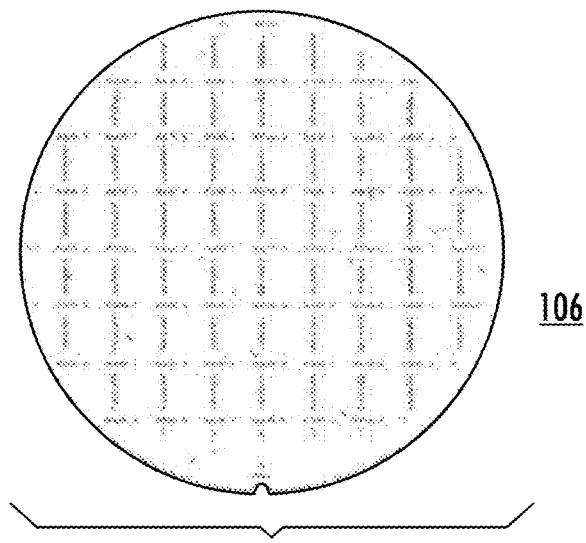
FIG. 1

SPOT WAFER DEFECT MAP

EMPTY WAFER DEFECT MAP

MACHINE LEARNING TECHNIQUES FOR WAFER DEFECT MAP CLASSIFICATION

TECHNOLOGICAL FIELD

Example embodiments of the present disclosure relate generally to classification systems, and more particularly to systems and methods for pattern-based classifications.

BACKGROUND

Various embodiments of the present disclosure address technical challenges related to performing classification. Through applied effort, ingenuity, and innovation, Applicant has solved problems related to performing classifications, such as wafer defect map classifications by developing solutions embodied in the present disclosure, which are described in detail below.

BRIEF SUMMARY

In general, various embodiments of the present disclosure provide methods, apparatus, systems, computing devices, computing entities for generating classification predictions for wafer defect maps. Various embodiments are directed to a device comprising: one or more processors; an unsupervised classification circuitry, configured to execute one or more instructions to: generate, using a non-linear dimensionality reduction machine learning model and based at least in part on vector representations for a set of wafer defect map images, reduced feature data, wherein the reduced feature data comprises feature data for the set of wafer defect map images in a reduced dimensionality space; generate, using a density-based clustering machine learning model and based at least in part on the reduced feature data, one or more wafer defect pattern clusters, wherein each wafer defect map image is associated with a particular wafer defect pattern cluster of the one or more wafer defect pattern clusters; and generate a classification prediction for each wafer defect map image based at least in part on the particular wafer defect pattern cluster associated with the respective wafer defect map image.

In various embodiments, the set of wafer defect map images may comprise preprocessed wafer defect map images.

In various embodiments, the unsupervised classification circuitry, may be configured to execute the one or more instructions to generate the preprocessed wafer defect map images by (i) reducing the spatial dimension for each wafer defect map image in the set of wafer defect map images, and (ii) performing one or more filtering operations to remove non-qualifying wafer defect map images from the set of wafer defect map images.

In various embodiments, the unsupervised classification circuitry may be configured to execute the one or more instructions to generate the vector representations for the set of wafer defect map images based at least in part by performing a flattening operation on each wafer defect map image in the set of wafer defect map images.

In various embodiments, the non-linear dimensionality reduction machine learning model may be a Uniform Manifold Approximation and Projection machine learning model; and the unsupervised classification circuitry may be configured to execute the one or more instructions to generate the reduced feature data by performing Uniform Manifold Approximation and Projection on the vector representations for the set of wafer defect map images.

In various embodiments, the density-based clustering machine learning model may be a Hierarchical Density-Based Spatial Clustering of Applications with Noise (HDBSCAN) machine learning model.

In various embodiments, the unsupervised classification circuitry may be configured to execute the one or more instructions to generate the classification prediction for each wafer defect map image by (i) assigning a label to each wafer defect pattern cluster, and (ii) associating the respective wafer defect map image with the label for the wafer defect pattern cluster associated with the respective wafer defect map.

In various embodiments, the unsupervised classification circuitry may be further configured to execute one or more instructions to: identify a cluster representative for each wafer defect pattern cluster of the one or more wafer defect pattern clusters; for each cluster representative: generate, based at least in part on a set of candidate class representatives, one or more pattern similarity scores, wherein: each pattern similarity score corresponds to a representative pair of one or more representative pairs, and each representative pair comprises the cluster representative and a particular candidate class representative from the set of candidate class representatives; and update based at least in part on association of each pattern similarity score with a non-qualifying pattern similarity score, a wafer defect pattern class corpus.

In various embodiments, the unsupervised classification circuitry may be configured to execute the one or more instructions to update the wafer defect pattern class corpus by updating a wafer defect pattern class database.

In various embodiments, the device may further comprise a supervised classification circuitry, configured to execute one or more instructions to: train, based at least in part on the updated wafer defect pattern class corpus, a convolutional neural network machine learning model configured to generate classification predictions for wafer defect maps.

Various embodiments are directed to a system, comprising: one or more memories; and an unsupervised classification circuitry, configured to execute one or more instructions to: generate, using a non-linear dimensionality reduction machine learning model and based at least in part on vector representations for a set of wafer defect map images, reduced feature data, wherein the reduced feature data comprises feature data for the set of wafer defect map images in a reduced dimensionality space; generate, using a density-based clustering machine learning model and based at least in part on the reduced feature data, one or more wafer defect pattern clusters, wherein each wafer defect map image is associated with a particular wafer defect pattern cluster of the one or more wafer defect pattern clusters; and generate a classification prediction for each wafer defect map image based at least in part on the particular wafer defect pattern cluster associated with the respective wafer defect map image.

In various embodiments, the set of wafer defect map images may comprise preprocessed wafer defect map images.

In various embodiments, the unsupervised classification circuitry may be configured to execute the one or more instructions to generate the preprocessed wafer defect map images by: (i) reducing the spatial dimension for each wafer defect map image in the set of wafer defect map images, and (ii) performing one or more filtering operations to remove non-qualifying wafer defect map images from the set of wafer defect map images.

In various embodiments, the unsupervised classification circuitry may be configured to execute one or more instructions to generate the vector representations for the set of wafer defect map images based at least in part by performing a flattening operation on each wafer defect map image in the set of wafer defect map images.

In various embodiments, the non-linear dimensionality reduction machine learning model may be a Uniform Manifold Approximation and Projection machine learning model; and the unsupervised classification circuitry is configured to execute the one or more instructions to generate the reduced feature data by performing Uniform Manifold Approximation and Projection on the vector representations for the set of wafer defect map images.

In various embodiments, the density-based clustering machine learning model may be a Hierarchical Density-Based Spatial Clustering of Applications with Noise (HDB-SCAN) machine learning model.

In various embodiments, the unsupervised classification circuitry may be configured to execute the one or more instructions to generate the classification prediction for each wafer defect map image by (i) assigning a label to each wafer defect pattern cluster, and (ii) associating the respective wafer defect map image with the label for the wafer defect pattern cluster associated with the respective wafer defect map.

In various embodiments, the unsupervised classification circuitry may be further configured to execute one or more instructions to: identify a cluster representative for each wafer defect pattern cluster of the one or more wafer defect pattern clusters; for each cluster representative: generate, based at least in part on a set of candidate class representatives, one or more pattern similarity scores, wherein: each pattern similarity score corresponds to a representative pair of one or more representative pairs, and each representative pair comprises the cluster representative and a particular candidate class representative from the set of candidate class representatives; and update based at least in part on association of each pattern similarity score with a non-qualifying pattern similarity score, a wafer defect pattern class corpus.

In various embodiments, the unsupervised classification circuitry may be configured to execute the one or more instructions to update the wafer defect pattern class corpus by updating a wafer defect pattern class database.

In various embodiments, the system may further comprise a supervised classification circuitry, configured to execute one or more instructions to train, based at least in part on the updated wafer defect pattern class corpus, a convolutional neural network machine learning model configured to generate classification predictions for wafer defect maps.

Various embodiments are directed to a computer-implemented method for generating classification predictions for wafer defect maps, the computer-implemented method comprising: generating, using one or more processors and a non-linear dimensionality reduction machine learning model, and based at least in part on vector representations for a set of wafer defect map images, reduced feature data, wherein the reduced feature data comprises feature data for the set of wafer defect map images in a reduced dimensionality space; generating, using the one or more processors and a density-based clustering machine learning model, and based at least in part on the reduced feature data, one or more wafer defect pattern clusters, wherein each wafer defect map image is associated with a particular wafer defect pattern cluster of the one or more wafer defect pattern clusters; and generating, using the one or more processors, a classification prediction for each wafer defect map image based at least in part on the particular wafer defect pattern cluster associated with the respective wafer defect map image.

In various embodiments, the set of wafer defect map images may comprise preprocessed wafer defect map images.

In various embodiments, the computer-implemented method may further comprise generating the preprocessed wafer defect map images, wherein generating the preprocessed wafer defect map images may comprise: reducing the spatial dimension for each wafer defect map image in the set of wafer defect map images; and performing one or more filtering operations to remove non-qualifying wafer defect map images from the set of wafer defect map images.

In various embodiments, the vector representations for the set of wafer defect map images may be generated based at least by performing a flattening operation on each wafer defect map image in the set of wafer defect map images.

In various embodiments, the non-linear dimensionality reduction machine learning model may be a Uniform Manifold Approximation and Projection machine learning model; and generating the reduced feature data comprises performing Uniform Manifold Approximation and Projection on the vector representations for the set of wafer defect map images.

In various embodiments, the density-based clustering machine learning model may be a Hierarchical Density-Based Spatial Clustering of Applications with Noise (HDB-SCAN) machine learning model.

In various embodiments, generating the classification prediction for each wafer defect map image may comprise: assigning a label to each wafer defect pattern cluster; and associating the respective wafer defect map image with the label for the wafer defect pattern cluster associated with the respective wafer defect map.

In various embodiments, the computer-implemented method may further comprise identifying, using the one or more processors, a cluster representative for each wafer defect pattern cluster of the one or more wafer defect pattern clusters; for each cluster representative: generating, using the one or more processors and based at least in part on a set of candidate class representatives, one or more pattern similarity scores, wherein each pattern similarity score corresponds to a representative pair of one or more representative pairs, wherein each representative pair comprises the cluster representative and a particular candidate class representative from the set of candidate class representatives; and updating, using the one or more processors, based at least in part on association of each pattern similarity score with a non-qualifying pattern similarity score, a wafer defect pattern class corpus.

In various embodiments, updating the wafer defect pattern class corpus may comprise updating a wafer defect pattern class database.

In various embodiments, the computer-implemented method may further comprise: training, using the one or more processors and based at least in part on the updated wafer defect pattern class corpus, a convolutional neural network machine learning model configured to generate classification predictions for wafer defect maps.

BRIEF DESCRIPTION OF THE SEVERAL VIEWS OF THE DRAWINGS

Having thus described the disclosure in general terms, reference will now be made to the accompanying drawings, which are not necessarily drawn to scale, and wherein:

FIG. 1 depicts example wafer defect maps in accordance with at least some embodiments discussed herein.

Figure 2:
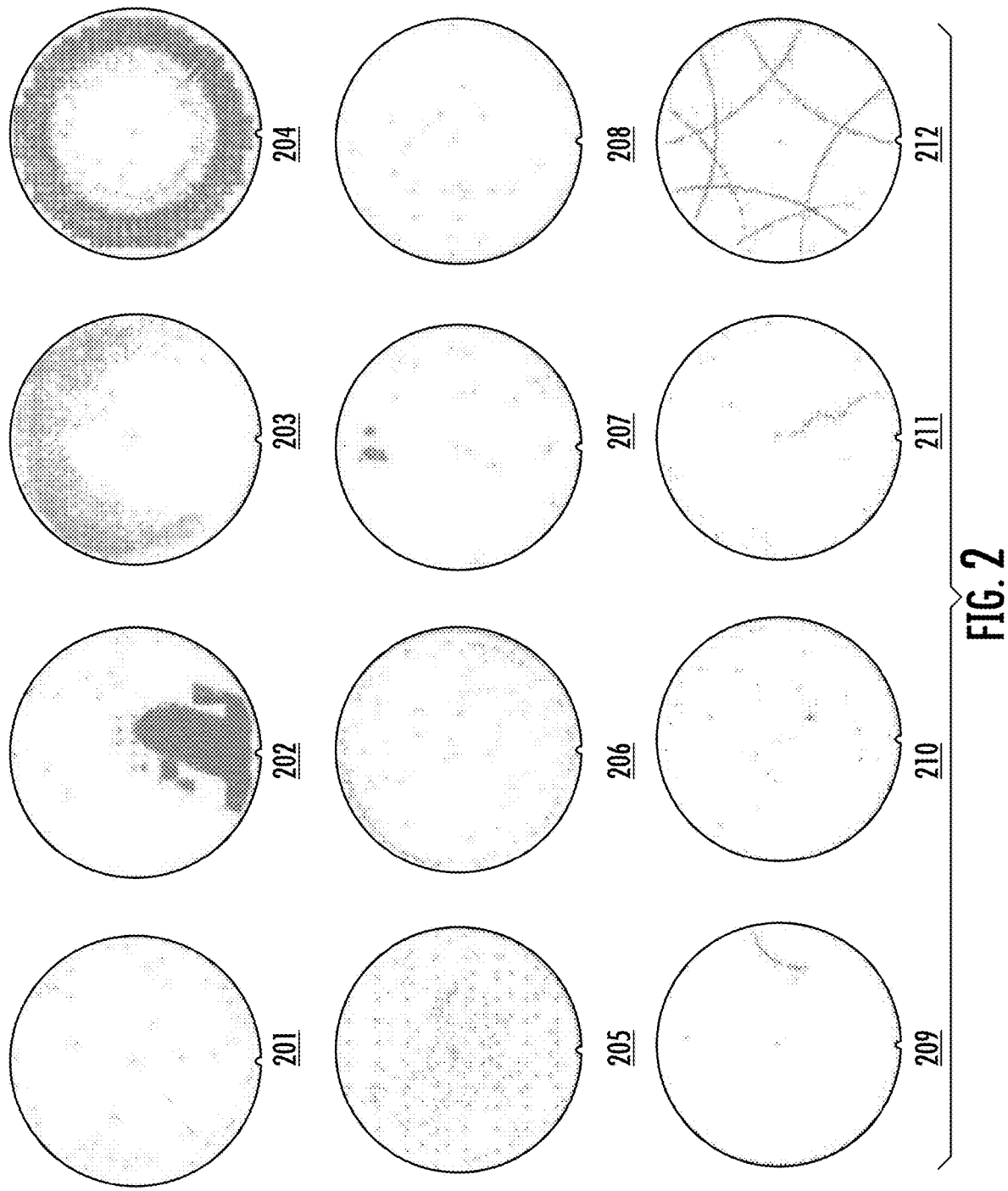

FIG. 2 illustrates an example set of wafer defect pattern classes into which wafer defect maps may be classified in accordance with at least some embodiments discussed herein.

Figure 3:
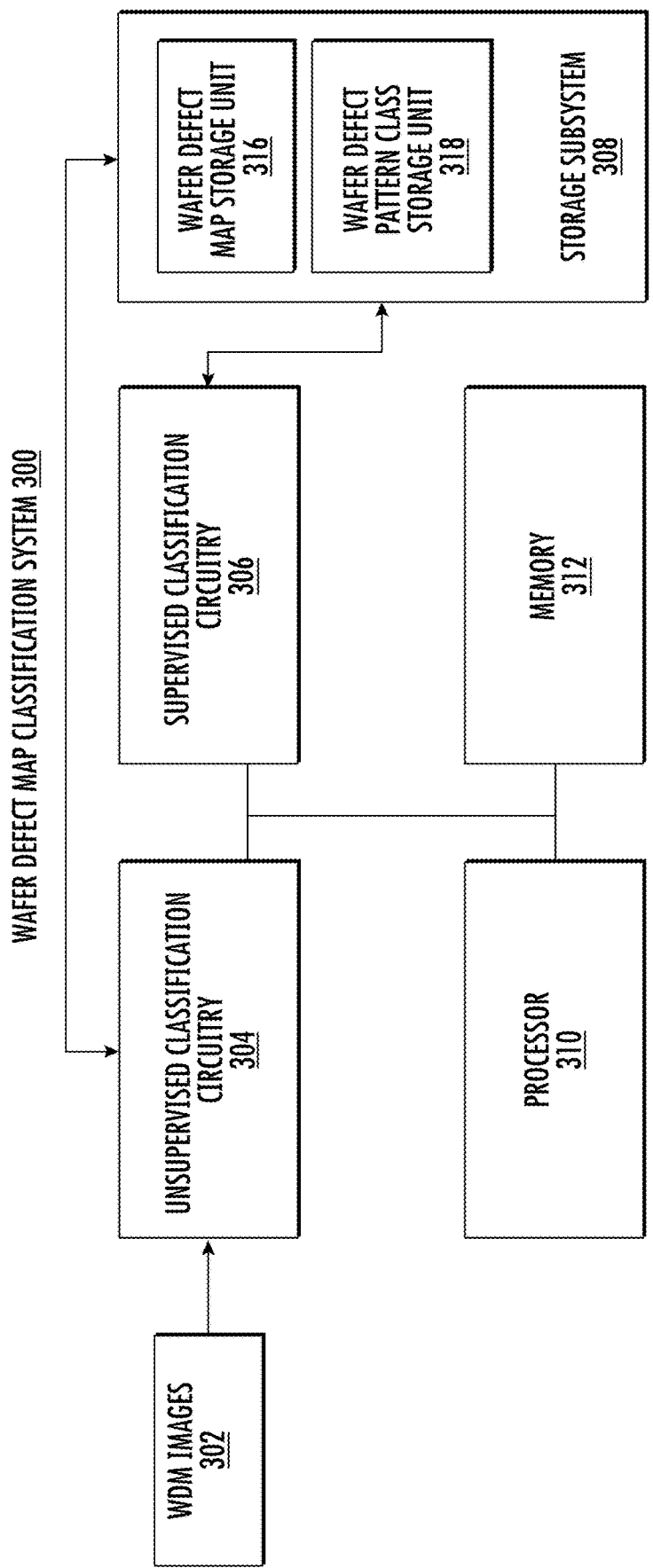

FIG. 3 is a functional block diagram of an example wafer defect map classification system in accordance with at least some embodiments discussed herein.

Figure 4:
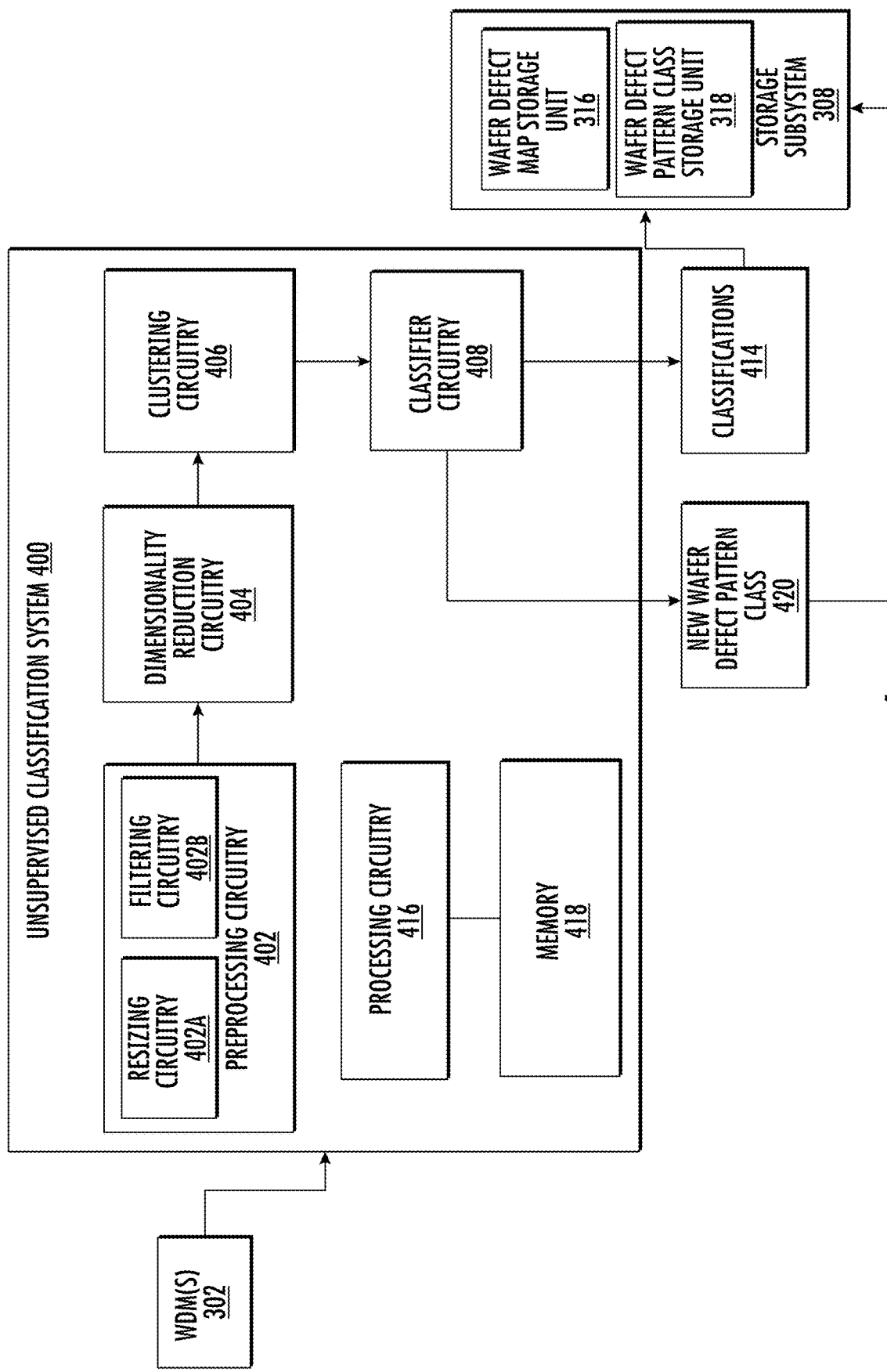

FIG. 4 is a functional block diagram of an unsupervised classification system in accordance with at least some embodiments discussed herein.

Figure 5A:
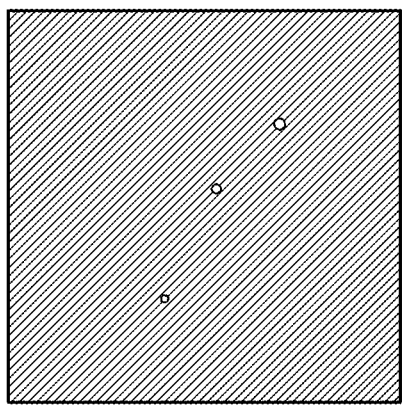
Figure 5B:
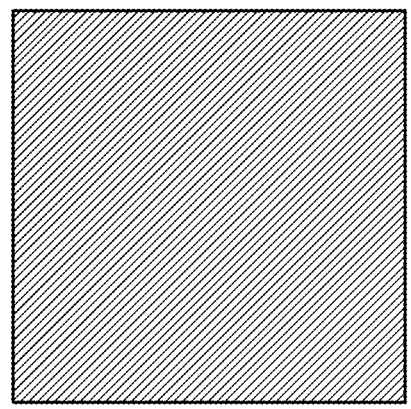

FIGS. 5A and 5B depicts examples of non-qualifying wafer defect map images in accordance with at least some embodiments discussed herein.

FIGS. 6A-D illustrates examples of elements of a simplicial complex in accordance with at least some embodiments discussed herein.

Figure 7:
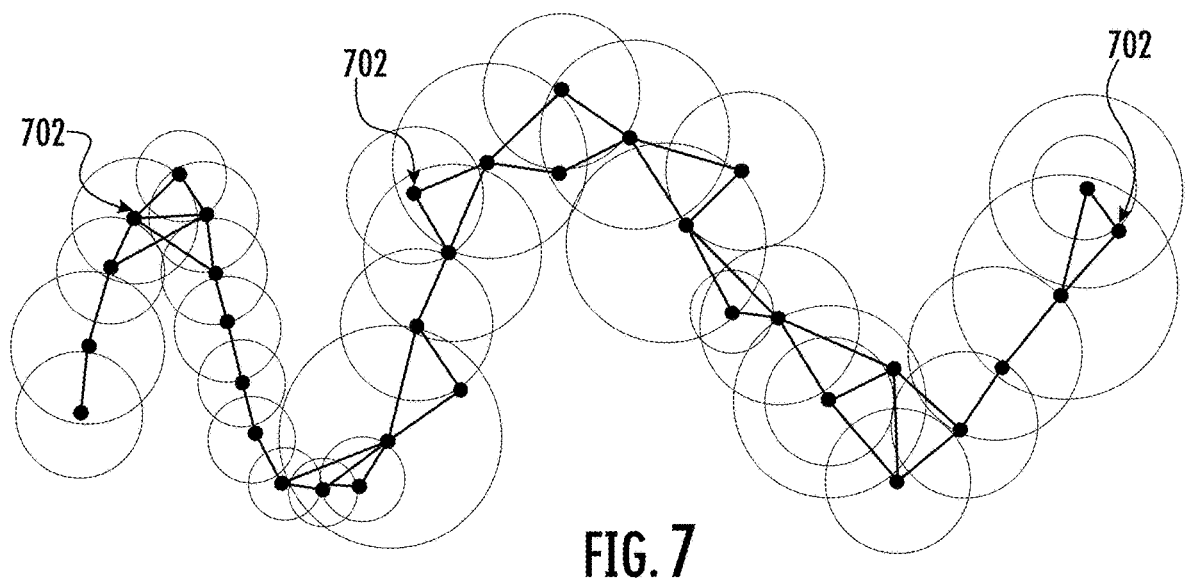

FIG. 7 illustrates an example of 2-dimensional k-Nearest Neighbor (KNN) graph in accordance with at least some embodiments discussed herein.

Figure 8:
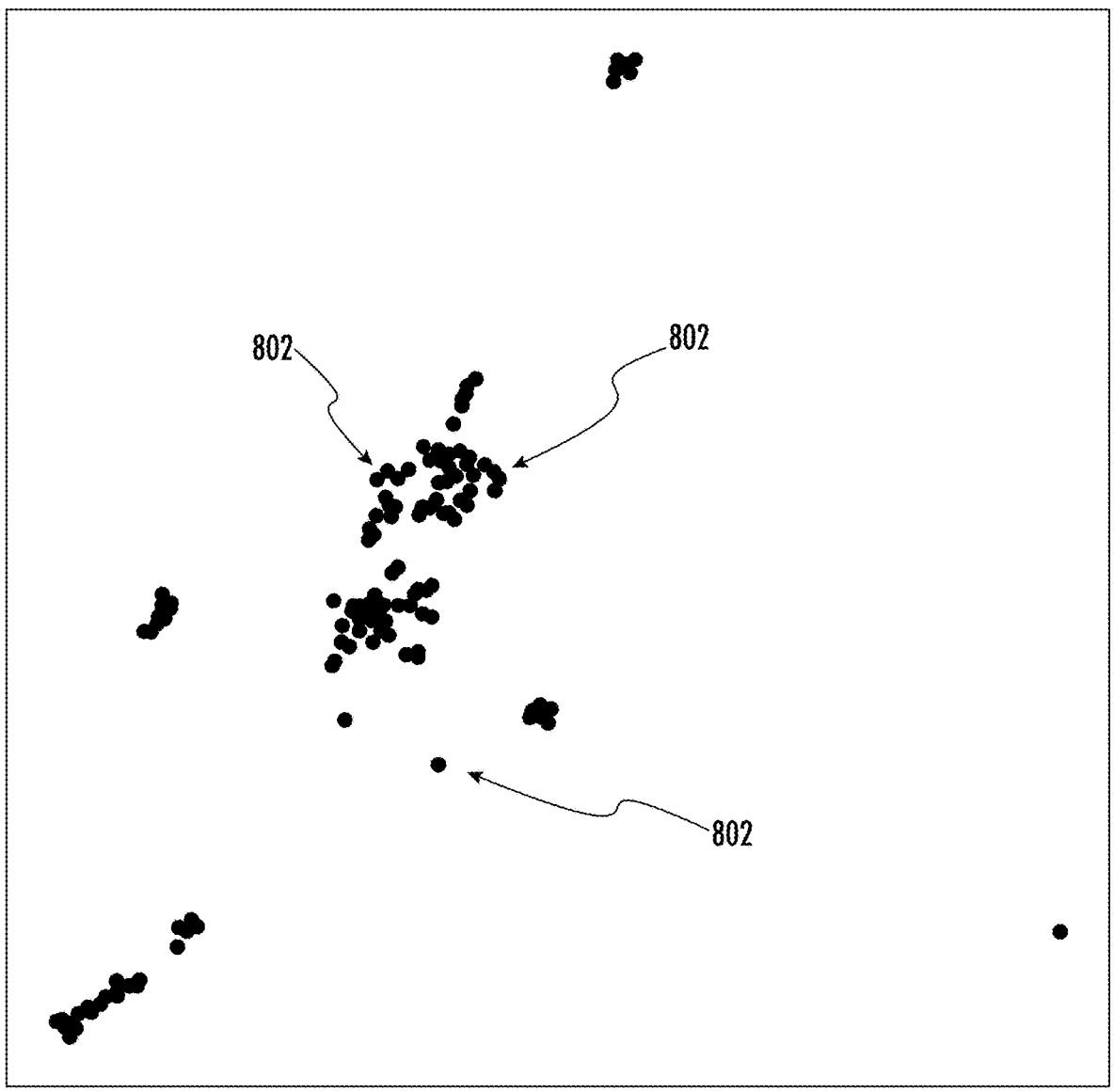

FIG. 8 illustrates an example 2-dimensional low-dimensional graph associated with an example set of wafer defect maps in accordance with at least some embodiments discussed herein.

Figure 9:
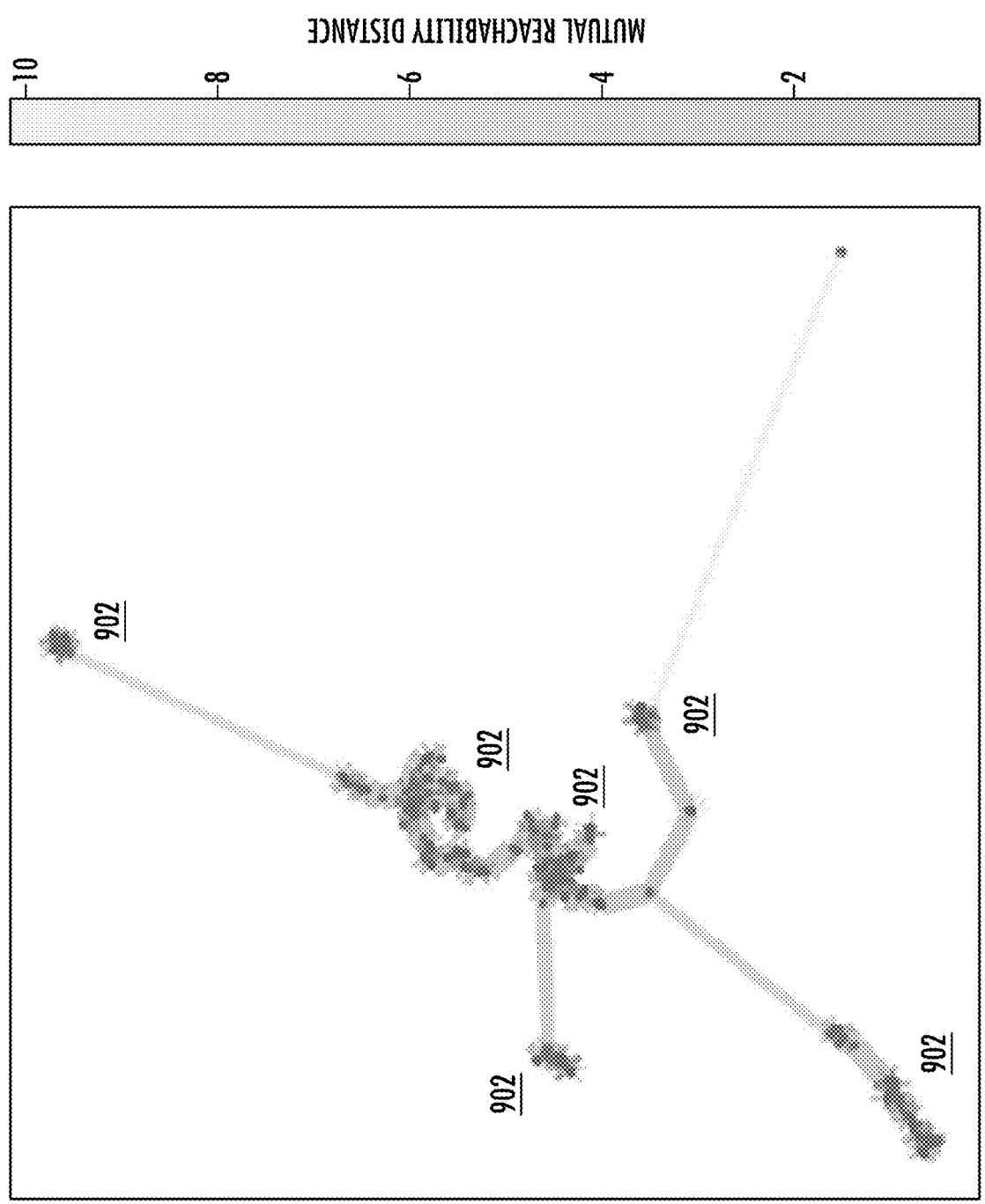

FIG. 9 illustrates an example of an optimized graph associated with an example set of wafer defect maps in accordance with at least some embodiments discussed herein.

Figure 10:
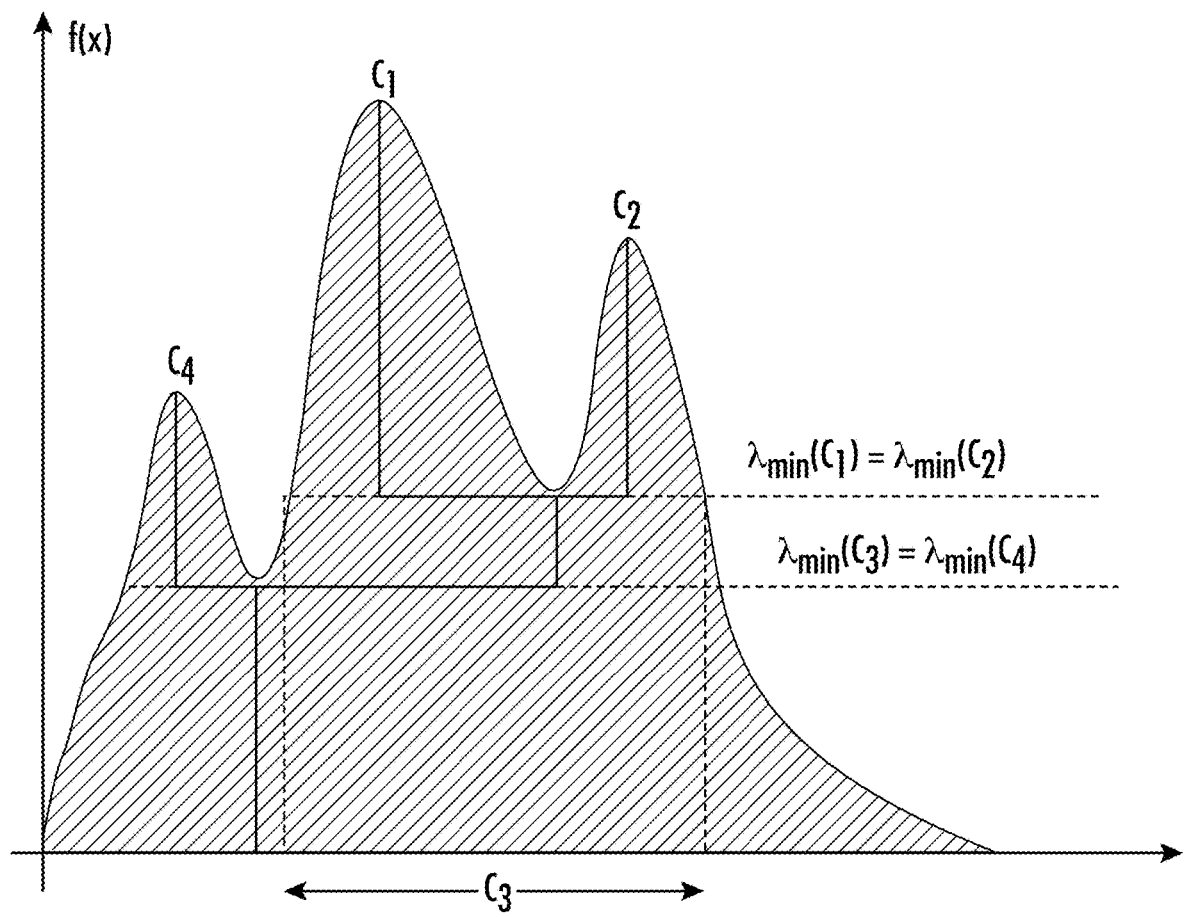

FIG. 10 illustrates an example, application of an "excess of mass" technique in accordance with at least some embodiments discussed herein.

Figure 11:
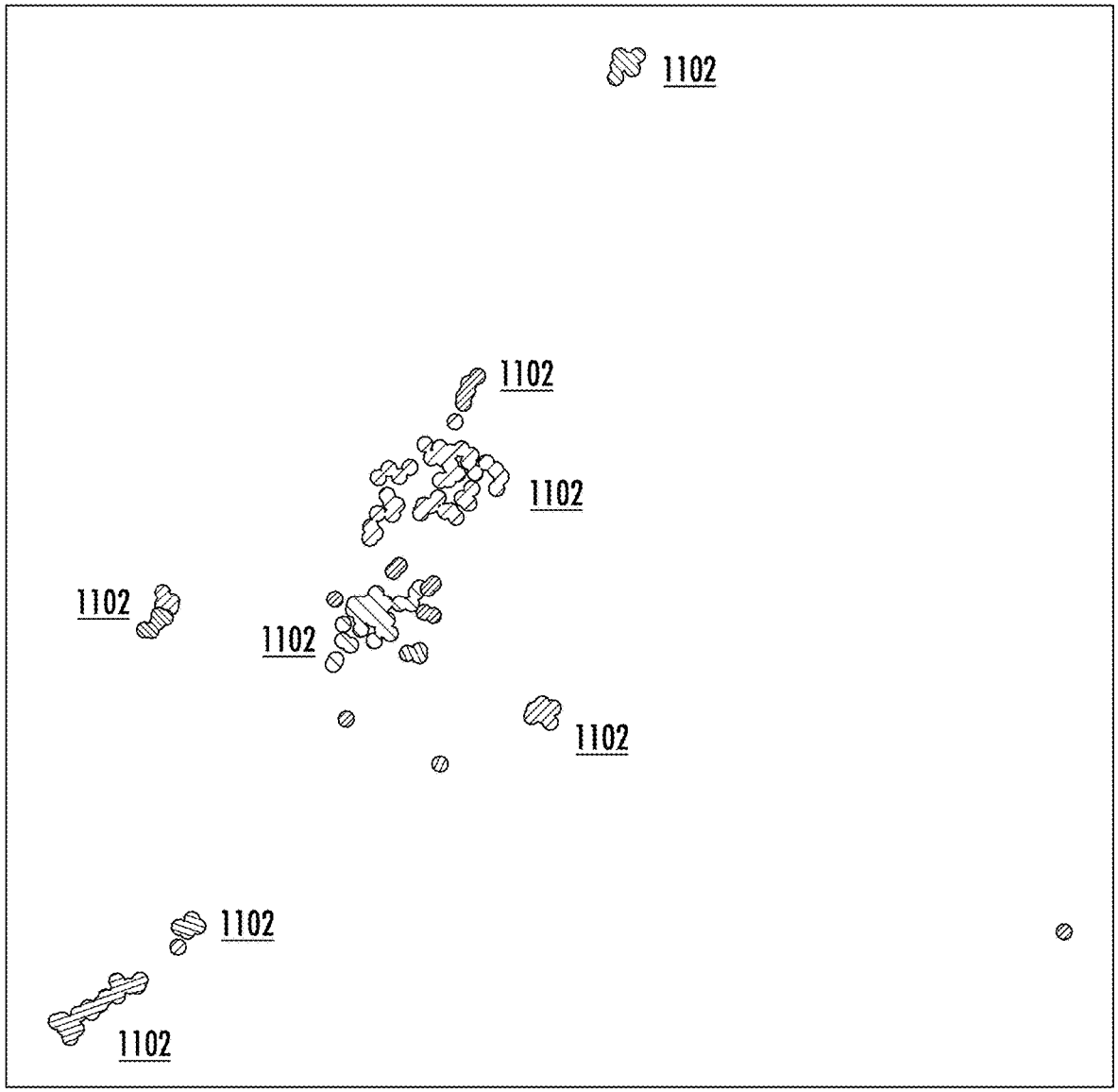

FIG. 11 illustrates an example set of wafer defect pattern clusters associated with an example set of wafer defect maps in accordance with at least some embodiments discussed herein.

Figure 12:
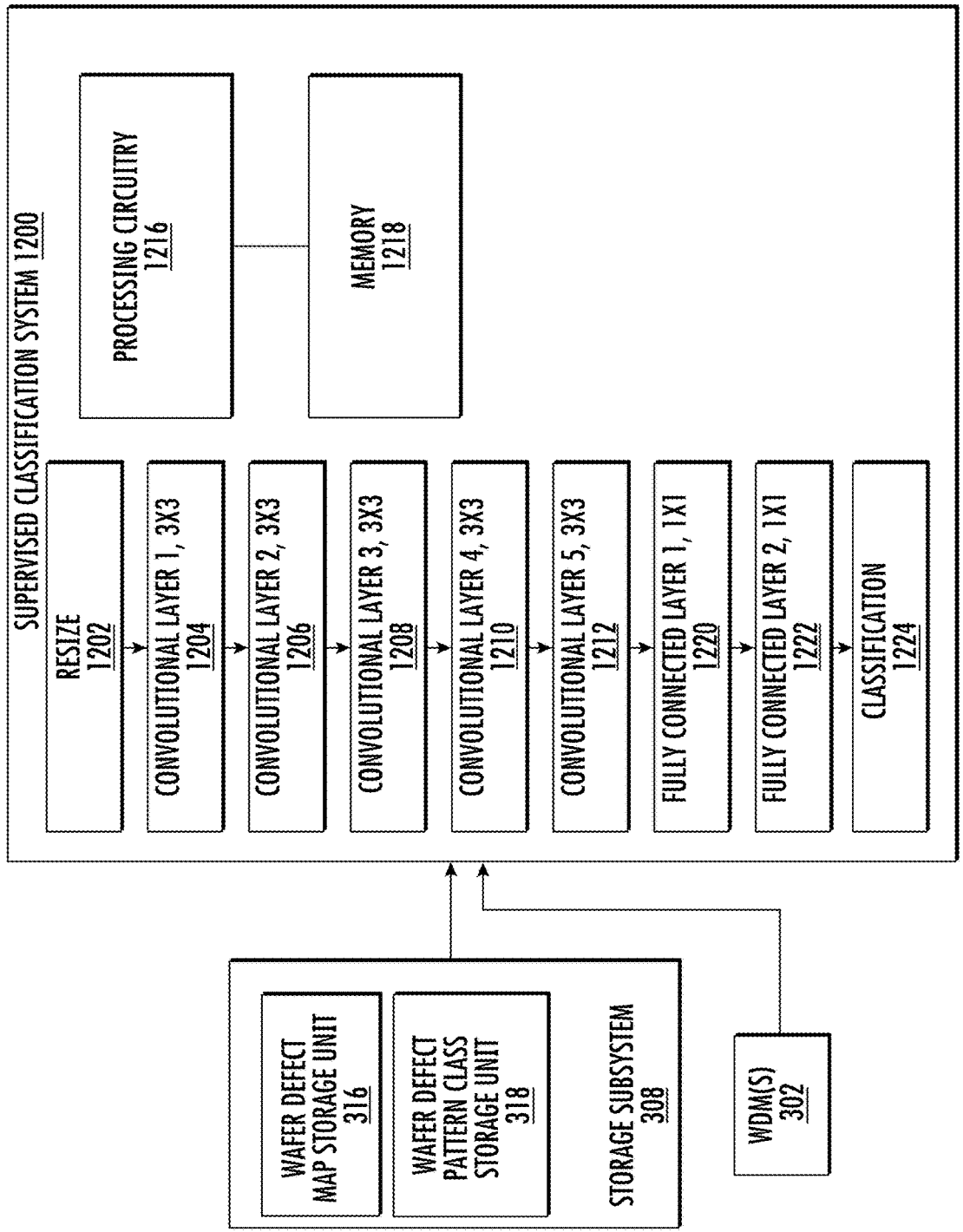

FIG. 12 is a functional block diagram of an example supervised classification system 1200 in accordance with at least some embodiments discussed herein.

Figure 13:
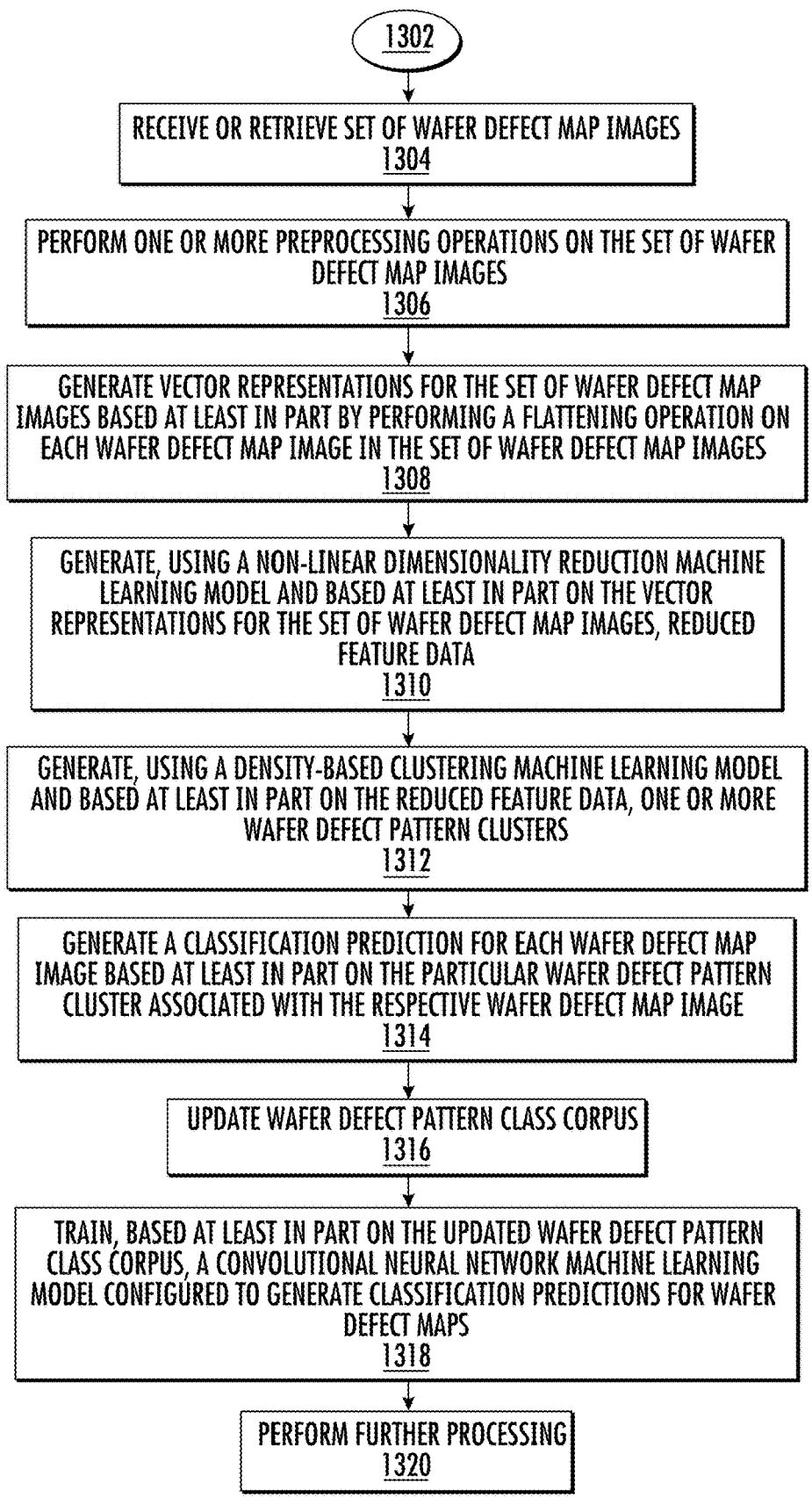

FIG. 13 illustrates an example method of classifying wafer defect maps in accordance with at least some embodiments discussed herein.

Figure 14:
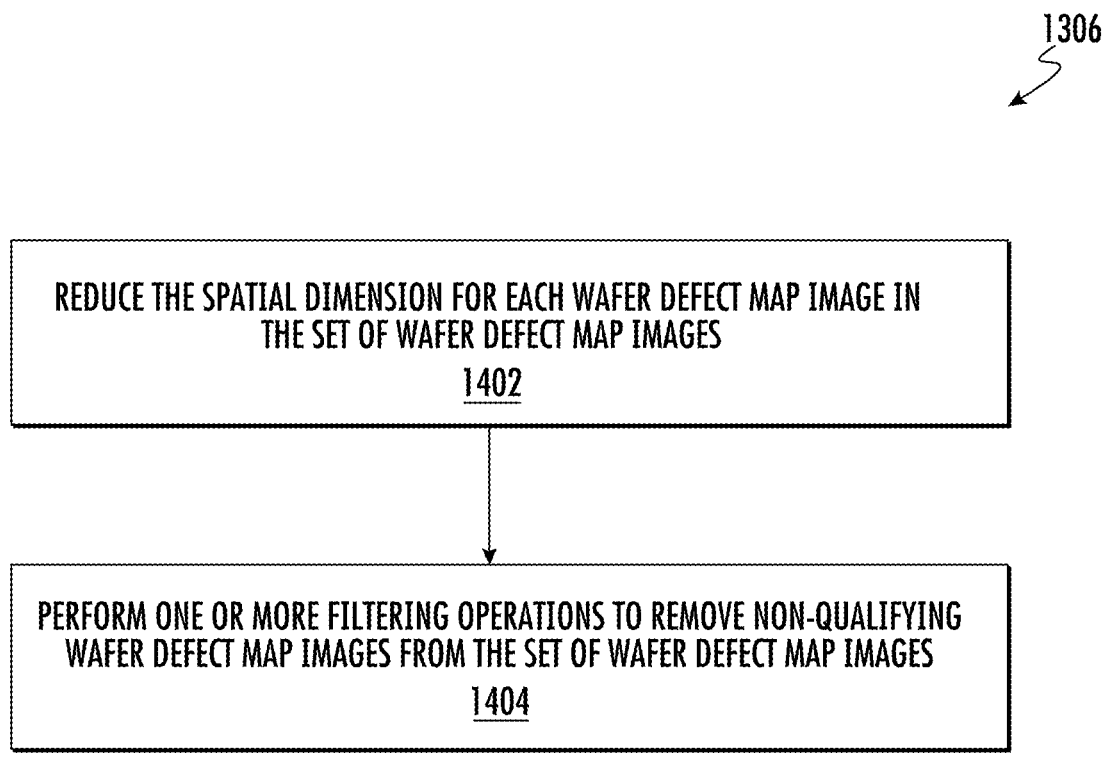
Figure 15:
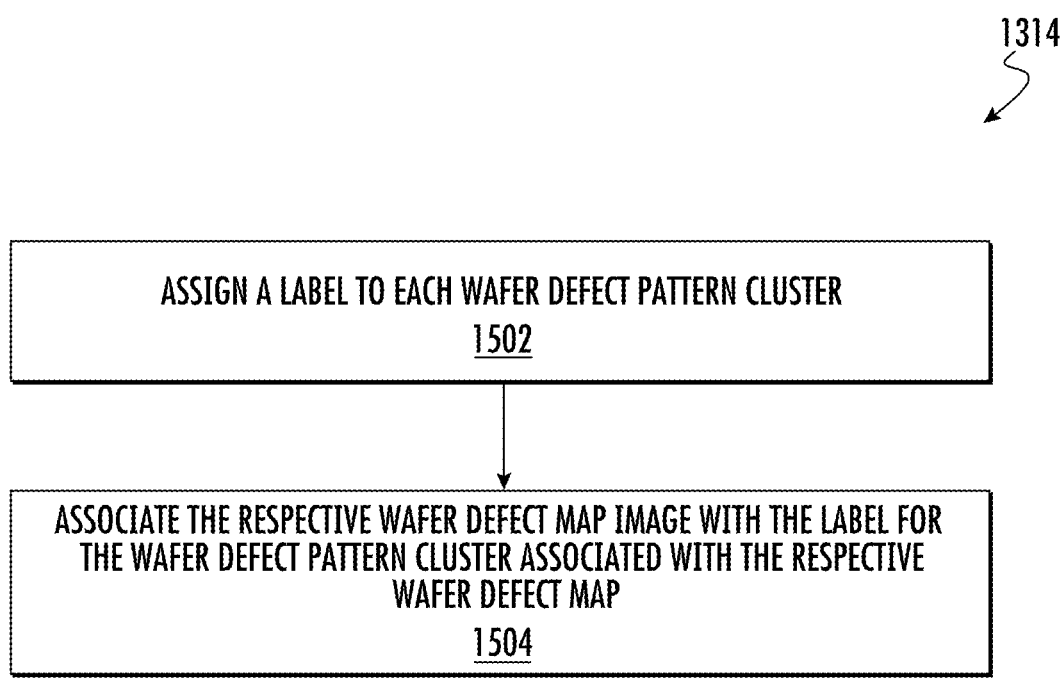

FIG. 14 illustrates an example method for preprocessing wafer defect map images in accordance with at least some embodiments discussed herein FIG. 15 illustrates an example method for generating a classification prediction in accordance with at least some embodiments discussed herein.

Figure 16:
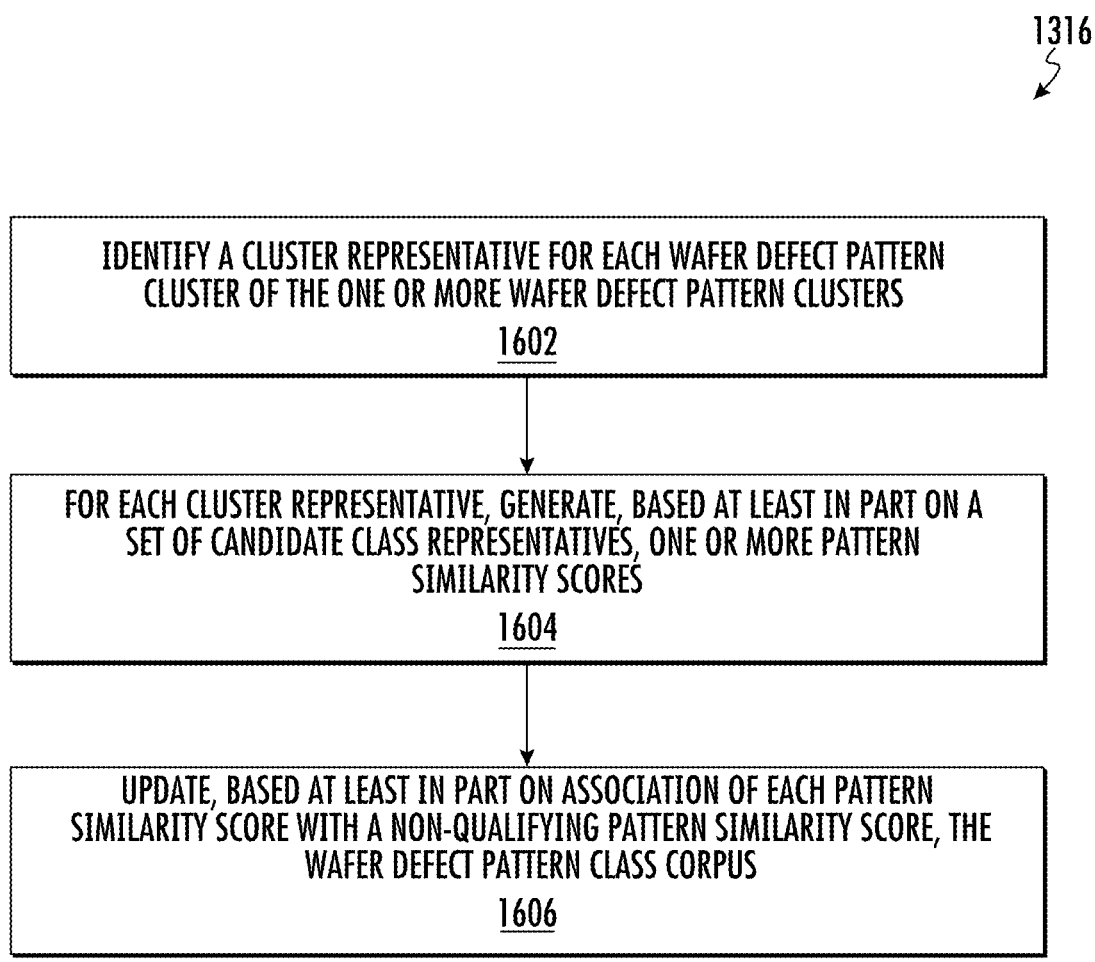

FIG. 16, illustrates an example method of updating a wafer defect pattern corpus in accordance with at least some embodiments discussed herein.

Figure 17:
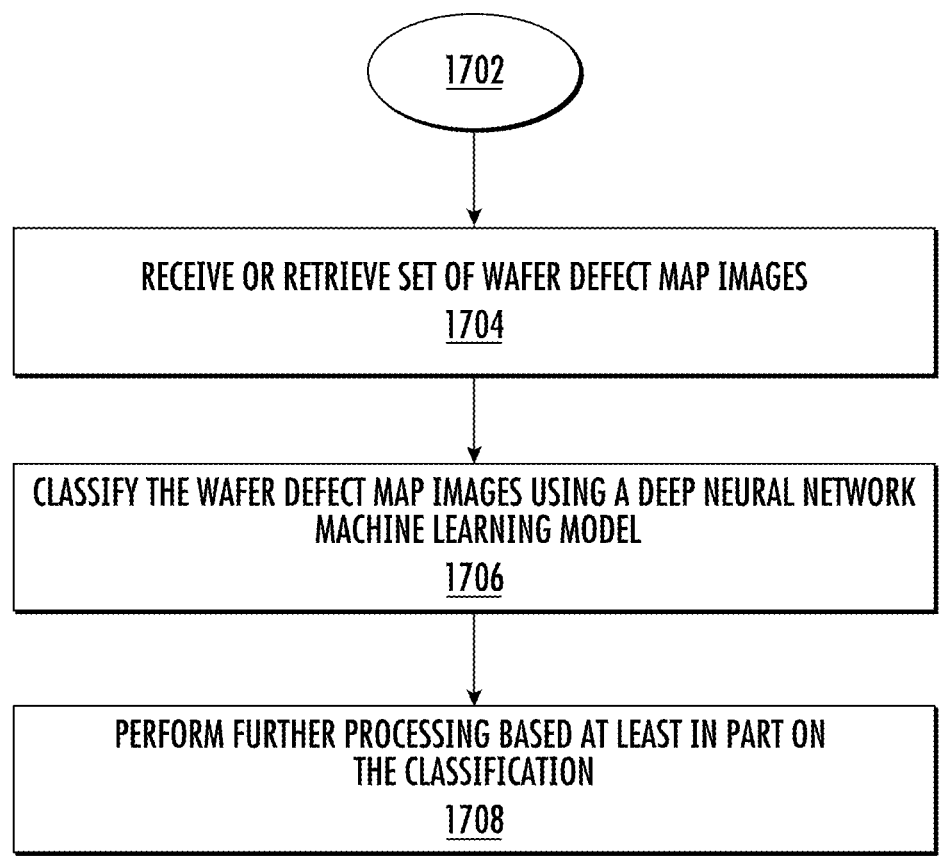

FIG. 17 illustrates an example method of classifying wafer defect maps in accordance with at least some embodiments discussed herein.

Figure 18:
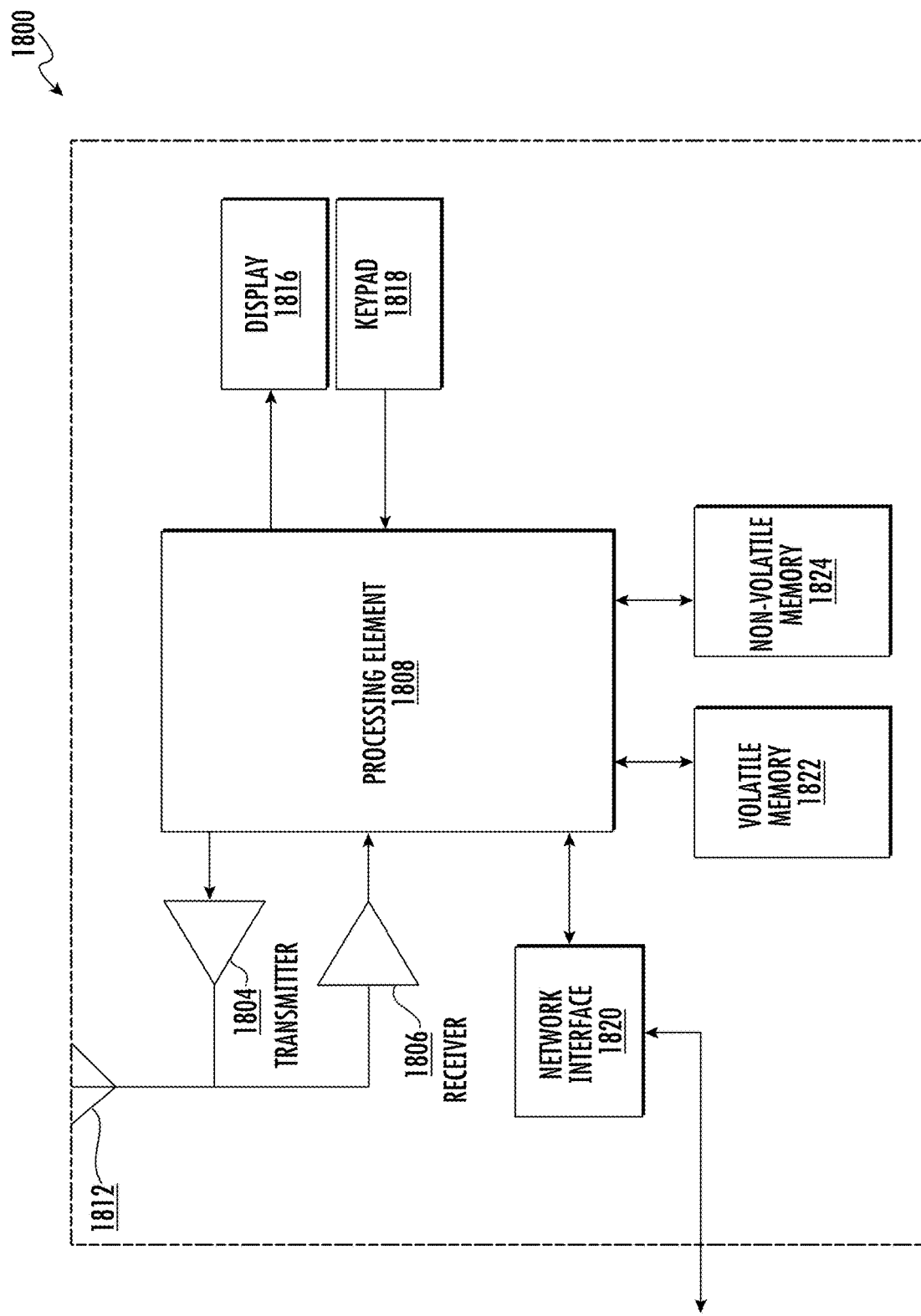

FIG. 18 is a functional block diagram of an example external computing entity in accordance with at least some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

In the following description, certain details are set forth in order to provide a thorough understanding of various embodiments of devices, systems, methods, and articles. However, one of skill in the art will understand that other embodiments may be practiced without these details. In other instances, structures and methods associated with, for example, manufacturing of wafers, such as deposition steps, etching steps, separating steps, and/or the like; circuits, such as transistors, multipliers, adders, dividers, comparators, transistors, integrated circuits, logic gates, finite state machines, convolutional accelerators, memories, interfaces, bus systems, and/or the like have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise Reference throughout this specification to "one embodiment," or "an embodiment" means that a particular feature, structure, or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements and have been selected solely for ease of recognition in the drawings.

While example embodiments of the present disclosure are described with reference to machine learning techniques for classifying wafer defect maps and identifying/determining wafer defect pattern classes (e.g., additional, unclassified defect patterns, or similar terms used herein interchangeably) for wafer defect maps using one or more techniques and/or combinations thereof, one of ordinary skill in the art will recognize that the disclosed concepts can be applied in other contexts, such as using one or more of techniques or combination thereof to classify other inputs (e.g., other images) and to identify/determine defect pattern classes for other inputs (e.g., other images).

During a wafer manufacturing/fabrication process, in some examples, a statistically significant sampling of wafers may be performed at various steps of the process. For example, after each deposition, etching, stripping, cleaning, etc., process an inspection may be performed. In some example, individual inspection stations may be added to the processing line to sample the wafers so as to allow one or more wafers to be manually examined using visual inspection. As a result of the visual inspection process or the inspection process generally, wafer defect maps may be generated that allows for wafer defect analysis based at least in part by processing the noted wafer defect maps (see e.g., FIG. 1). Production-process drift, in some examples, can be generated in a various device manufacturing steps which may cause defects in wafers.

FIG. 1 illustrates example wafer defect map images having defect patterns consistent with various types of example manufacturing problems, including fingerprint pattern 102 (a pattern presenting fingerprints consistent with a problem due to an incorrect manipulation by an operator, geometric scratch pattern 104 (a pattern that has geometric scratches consistent with a problem due to loading or unloading from a machine, such as a machine handling error), and grid/checkboard pattern 106 (a pattern presenting a grid or checkboard pattern consistent with a problem during a lithography phase). From the type of pattern in the wafer defect map image, it may be possible to identify/determine the kind of defect (e.g., a scratch), the involved equipment (e.g., the particular piece of machinery), the specific process (e.g., etching), and the root cause (e.g., misalignment).

In some examples, visual inspection and classification of defects using microscopes may be performed. Based on the inspection, further processing of a lot or set of wafers or of subsequent lots or sets of wafers may be determined (e.g., dispose of a current lot or set, proceed with processing of the current lot or set without restriction, adjust processing of current and subsequent lots or sets, etc., and various combinations thereof). A manual inspection process, however, and in some examples, may be time consuming, may have inconsistencies among operators, and inaccuracies due to human errors, subjectivity, and fatigue.

In some examples, an automated inspection system may generate a wafer defect map containing coordinates of each defect of a wafer die of the sampling. The wafer defect map may take the form of a defect data file, such as a Klarf™ file. In some examples, a wafer defect map may include defect patterns, such as a specific spatial arrangement of defects within the wafer. The patterns may be analyzed to determine a root cause or potential cause of a defect or defects within the wafer.

However, and in some examples, refined manufacturing processes and/or new production-process drift may result in creation of wafer defect maps that have different defect patterns relative to a defect pattern space comprising defect patterns in which an example classification system may assign wafer defect maps. These different defect patterns (e.g., additional defect patterns, unclassified defect patterns, and/or similar terms used herein interchangeably) may make wafer defect pattern analysis challenging, and may cause example classification systems to inaccurately assign wafer defect maps due at least in part to lack of capability of the noted example classification systems to identify/determine additional/unclassified wafer defect patterns that may be generated during a wafer manufacturing/fabrication process and/or due to at least in part to the noted example classification systems being associated with a defect pattern space that does not include (or otherwise account for) these additional/unclassified defect patterns that may be generated. Moreover, example classification systems can be computationally expensive, and thus impractical to implement in real time during a wafer manufacturing/fabrication process. Accordingly, and in some examples, a need exists for robust automated systems for efficiently and effectively classifying wafer defect patterns, and that has the capability to identify/determine additional/unclassified wafer defect patterns (e.g., additional/unclassified waver defect patterns that may be generated during a manufacturing process). In one or more example embodiments of the present disclosure, wafer defect maps may be analyzed to identify/determine wafer defect pattern class(es) and may be analyzed to classify the noted wafer defect maps.

FIG. 2 illustrates an example of a set of wafer defect pattern classes into which wafer defect maps may be classified. As illustrated in the depicted example of FIG. 2, the set of wafer defect pattern classes may comprise wafer defect pattern classes including a normal class 201, a big cluster class 202, a half-moon class 203, a donut class 204, a grid class 205, a ring class 206, a fingerprints class 207, an incomplete class 208, a geometric scratch class 209, a small cluster class 210, a zig-zig class 211, and a basketball class 212. Each wafer defect pattern class may be associated with a label configured to identify (e.g., uniquely identify) the particular class from other classes in the set of candidate wafer defect pattern classes. In one or more embodiments, the wafer defect pattern classes may be associated with tags that identify a root cause associated with a wafer defect map having a corresponding wafer defect pattern (e.g., wafer defect maps classified as belonging to the corresponding wafer defect pattern class). While twelve wafer defect pattern classes are depicted in the example set of wafer defect pattern classes of FIG. 2, it should be understood, however, that a person of ordinary skill in the relevant art will recognize that the set of wafer defect pattern classes may include more than twelve wafer defect pattern classes or less than twelve wafer defect pattern classes, and may include other wafer defect pattern classes not depicted in FIG. 2.

In one or more embodiments, example wafer defect pattern classes may be identified/determined using a machine learning model, such as an unsupervised machine learning model and/or a supervised machine learning model. According to one or more embodiments described herein, an unsupervised machine learning model may describe a machine learning model configured to learn patterns or features of wafer defect maps without labeled input (e.g., without labeled or otherwise classified wafer defect maps as input to the machine learning model). According to one or more example embodiments described herein, a supervised machine learning model may describe a machine learning model configured to classify wafer defect maps using candidate wafer defect pattern classes, wherein candidate wafer defect pattern classes may describe wafer defect pattern classes that have been previously identified as classes into which wafer defect maps may be classified (e.g., assigned). For example, candidate wafer defect pattern classes may describe classified wafer defect patterns.

In one or more example embodiments, a deep neural network (DNN), such as a convolutional neural network (CNN), Vision Transformers, and/or the like may employ image classification techniques (or other suitable techniques) to classify wafer defect maps based at least in part on candidate wafer defect pattern classes (e.g., classified wafer defect patterns), wherein in one or more embodiments, the candidate wafer defect pattern classes may be updated with additional wafer defect patterns classes (e.g., additional/unclassified wafer defect patterns identified/determined using machine learning model, such as an unsupervised machine learning model).

FIG. 3 illustrates an embodiment of a wafer defect map classification system 300 which can automatically and/or in response to an input, such as a user input, identify additional wafer defect pattern classes and/or can automatically and/or in response to an input, such as a user input, classify wafer defect maps. In general, the terms computing system, computer, system, device, entity, and/or similar words used herein interchangeably can refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The system 300 can receive or retrieve a set of wafer defect map images 302 (e.g., one or more wafer defect map images) as input. In one or more embodiments, the set of wafer defect map images may be received from an external computing entity, such as example external computing entity 1800 (see e.g., FIG. 18) and/or may be retrieved from a database storing wafer defect map images (e.g., database storing digital image representations of wafer defect maps generated during a wafer fabrication/production process, for example, by a wafer manufacturing quality control system or process). In one or more embodiments, the wafer defect map images may comprise high-resolution binarized wafer defect map images, such as 20,000×20,000 pixels images. In an operational example, the wafer defect map images may comprise silicon wafer defect map images and/or silicon carbide wafer defect map images.

As illustrated in FIG. 3, the system 300 may include an unsupervised classification circuitry 304. The unsupervised classification circuitry 304 may be configured to analyze wafer defect map images to generate one or more classification predictions for the wafer defect map images. Additionally, and/or alternatively, the unsupervised classification circuitry 304 can analyze wafer defect map images to identify additional/unclassified wafer defect patterns based at least in part on the wafer defect map images. For example, in one or more example embodiments, the unsupervised classification circuitry 304 can receive or retrieve a set of wafer defect map images 302, analyze the set of wafer defect map images 302, generate one or more wafer defect pattern clusters based at least in part on the analyzed set of wafer defect map images, and identify/determine additional/unclassified wafer defect pattern class(es) based at least in part on the one or more wafer defect pattern clusters. A wafer defect pattern cluster may comprise a grouping of wafer defect patterns that are determined to be similar (e.g., having a high embedding similarity) based at least in part on a similarity measure, such as a distance-based similarity measure. As further discussed below, wafer defect patterns may be analyzed (e.g., based at least in part on a distance-based similarity measure) to determine a measure of similarity with respect to the wafer defect patterns, wherein wafer defect patterns having a distance measure relative to one another that satisfies a similarity measure threshold may be determined to be similar.

In one or more example embodiments, the unsupervised classification circuitry 304 compares the one or more wafer defect pattern clusters with candidate wafer defect pattern classes (e.g., classified wafer defect patterns) to determine if a wafer defect pattern cluster should be adopted as an additional wafer defect pattern class. For example, in one or more embodiments, the unsupervised classification circuitry 304 can associate a wafer defect map with a corresponding wafer defect pattern class (e.g., identified/determined additional wafer defect pattern class or candidate wafer defect pattern class) based at least in part on the wafer defect pattern cluster that the image representation of the wafer defect map belongs. As noted above, candidate wafer defect pattern classes may comprise wafer defect pattern classes (e.g., defined wafer defect patters classes) that have been previously identified as wafer defect patterns into which wafer defect maps may be classified. Further, as noted above, additional wafer defect pattern classes may comprise initially unclassified wafer defect patterns that are identified/determined by the unsupervised classification circuitry 304 and then classified.

The wafer defect map classification system 300 may include a storage subsystem 108. The storage subsystem 108 may be configured to store input data used by the wafer defect map classification system 300 to perform wafer defect map classifications as well as model definition data used by the wafer defect map classification system 300 to perform various classification tasks. In one or more embodiments, the storage subsystem 108 may be configured to store candidate wafer defect pattern classes. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In one or more embodiments, the storage subsystem may include a wafer defect pattern storage unit (e.g., wafer defect pattern storage database) configured for storing and maintaining candidate wafer defect pattern classes.

In one or more embodiments, the storage subsystem 108 may be configured to store wafer defect maps (e.g., corresponding wafer defect map images) analyzed by the wafer defect map classification system 300 (e.g., analyzed by the unsupervised classification circuitry 304 and/or analyzed by the supervised classification circuitry 306). In one or more embodiments, the storage subsystem 108 can include a wafer defect map storage unit 316 (e.g., wafer defect map database) configured to store analyzed wafer defect maps, wherein the stored wafer defect maps may be associated with corresponding wafer defect pattern class. In one or more embodiments, the storage subsystem 108 can include a wafer defect pattern class storage unit 318 (e.g., wafer defect pattern class database) configured to store candidate wafer defect pattern classes, wherein the unsupervised classification circuitry 304 can update the wafer defect pattern class storage unit 318 (e.g., by storing identified additional wafer defect pattern classes therein).

As illustrated in FIG. 3, the system 300 may include a supervised classification circuitry 306. The supervised classification circuitry 306 can analyze wafer defect map images with respect to candidate wafer defect pattern classes (as described above) to generate classification predictions for the wafer defect map images. In one or more embodiments, the supervised classification circuitry 306 may be configured to operate in a plurality of phases that may include one or more of: a training phase, a testing phase, or a classification phase. During a training phase, a machine learning model can be learned by the supervised classification circuitry 306. During a test or use phase, a set of labels (e.g., wafer defect pattern classes) which have the best match to a set of wafer defect maps according to the machine learning model may be generated as output by the supervised classification circuitry 306. For example, a machine learning model, such as a supervised machine learning model can be trained to learn patterns in wafer defect map images and classify the wafer defect map images. Additionally, the machine learning model can be trained to learn the failure types corresponding to the learned patterns in wafer defect map images.

In one or more embodiments, the supervised classification circuitry 306 may be configured to train, fine-tune and/or re-train the noted machine learning model (e.g., a supervised machine learning model) on a wafer defect pattern class corpus comprising candidate wafer defect pattern classes and identified additional wafer defect pattern classes. For example, responsive to identification of additional wafer defect pattern class(es) by the unsupervised classification circuitry 304, the supervised classification circuitry 306 may train, fine-tune and/or re-train the noted machine learning model using labeled training data. The labeled train data, for example, may comprise wafer defect map images along with corresponding labels, wherein the labels comprise the wafer defect pattern class corpus (as described above). That is the supervised circuitry may train, fine-tune and/or re-train the machine learning model based on the candidate wafer defect pattern classes, as well as identified additional wafer defect pattern classes. In one or more embodiments, the machine learning model may be a deep neural network machine learning model (e.g., a deep convolutional neural network machine learning model, a Vision Transformer, and/or the like).

As illustrated, the system 300 may comprise one or more processors 310 and one or more memories 312, which may be used to implement the functionality of the unsupervised classification circuitry 304 and the supervised classification circuitry 306. The system 300 as illustrated may comprise one or more bus systems, and may comprise additional circuitry, such as power supplies, interfaces, and/or the like, which are omitted for ease of illustration.

FIG. 4 illustrates an embodiment of an unsupervised classification system 400, which may be employed, for example, as the unsupervised classification circuitry 304 of FIG. 3. The unsupervised classification system 400 as illustrated includes a preprocessing circuitry 402, dimensionality reduction circuitry 404, clustering circuitry 406, and classifier circuitry 408. The system 400 can receive a set of wafer defect map images as input, and output a set of classifications 414 (e.g., assign classes to wafer defect map images) and/or one or more identified additional wafer defect pattern class. As illustrated, the system 400 may include a processing circuitry 416 (also referred to as processors, processing element, and/or similar terms used herein interchangeably), and one or more memories 418, which may be used to implement the functionality of the preprocessing circuitry 402, dimensionality reduction circuitry 404, clustering circuitry 406, and classifier circuitry 408, and may include additional circuitry such as power supplies, interfaces, etc., which are omitted for ease of illustration. For example, the system 400 may include one or more communications interfaces for communicating with various computing entities, such as by communicating data, content, information, and/or similar terms used herein interchangeably that can be transmitted, received, operated on, processed, displayed, stored, and/or the like. In one embodiment, the system 400 can include or otherwise be in communication with a processing circuitry 416 that communicate with other elements/circuitry within the system 400 via a bus, for example. As will be understood, the processing circuitry 416 may be embodied in a number of different ways.

For example, the processing circuitry 416 may be embodied as one or more complex programmable logic devices (CPLDs), microprocessors, multi-core processors, coprocessing entities, application-specific instruction-set processors (ASIPs), microcontrollers, and/or controllers. Further, the processing circuitry 416 may be embodied as one or more other processing devices or circuitry. The term circuitry may refer to an entirely hardware embodiment or a combination of hardware and computer program products. Thus, the processing circuitry 416 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing circuitry 416 may be configured for a particular use or configured to execute instructions stored in volatile or non-volatile media or otherwise accessible to the processing circuitry 416. As such, whether configured by hardware or computer program products, or by a combination thereof, the processing circuitry 416 may be capable of performing steps or operations according to embodiments of the present disclosure when configured accordingly.

In one embodiment, the system 400 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one or more embodiments, the preprocessing circuitry 402, in operation, performs one or more preprocessing operations on the input set of wafer defect map images (e.g., wafer defect map images received/retrieved by the system 400) to generate a set of preprocessed wafer defect map images, wherein each preprocessed wafer defect map image in the set of preprocessed wafer defect map image corresponds to a wafer defect map image in the set of wafer defect map images. In one or more embodiments, generating the set of preprocessed wafer defect map images comprises resizing the wafer defect map images (e.g., using one or more of a variety of resizing models). Additionally, and/or alternatively, in one or more embodiments, generating the set of preprocessed wafer defect map images comprises filtering the set of wafer defect map images (e.g., using one or more of a variety of filtering models). For example, in some embodiments, the set of preprocessed wafer defect map images may be generated using an image preprocessing framework that includes a resizing model and a filtering model, wherein generating the set of preprocessed wafer defect maps images comprises resizing the wafer defect map images (e.g., using the resizing model) and filtering the resized wafer defect map images (e.g., using the filtering model). As illustrated in the depicted embodiment of FIG. 4, the preprocessing circuitry 402 may include a resizing circuitry 402A and a filtering circuitry 402B.

In one or more embodiments, the resizing circuitry 402A, in operation and in some examples, resizes the set of wafer defect map images, for example, using a resizing model. In one or embodiments, resizing the set of wafer defect map images may comprise reducing the spatial resolution of the set of wafer defect map images (e.g., wafer defect map images having a spatial resolution that exceeds a size threshold) to a selected size. For example, in an instance in which the set of wafer defect map images comprise 20,000× 20,000 pixels images and the selected size is 61×61 pixels, the resizing circuitry 402A, in operation, may reduce each wafer defect map image in the set of wafer defect map images to 61×61 pixels images. While, 20,000×20,000 pixels is described herein as an example wafer defect map size, it should be understood, however, that a person of ordinary skill in the relevant art will recognize that wafer defect map images may have a size that is less or greater than 20,000× 20,000 pixels.

In one or more example embodiments, the selected size in which the resizing circuitry 402A may be configured to resize wafer defect map images may be selected based at least in part on one or more rules/criteria, such as a selected size where the defect pattern information of the wafer defect map images is preserved when resized (e.g., reduced) to the selected size. The resizing circuitry 402A, in operation, may reduce the size of a given wafer defect map image using one or more of variety of resizing techniques. For example, in one or more embodiments, the resizing circuitry 402A, in operation, may reduce the size of a given wafer defect map image using bicubic technique (e.g., bicubic interpolation).

In one or more embodiments, the filtering circuitry 402B, in operation, filters the input set of wafer defect map images (or resized set of wafer defect map images in embodiments where the set of wafer defect map images are resized). In one or more embodiments, filtering the input set of wafer defect map images (or resized set of wafer defect map images) may comprise performing one or more filtering operations on the set of wafer defect map images to filter out non-qualifying wafer defect map images, for example, using a filtering model. For example, one or more filtering operations may be performed to remove non-qualifying wafer defect map images from the set of wafer defect map images. In one or more embodiments, a non-qualifying wafer defect map image may describe a wafer defect map image having a defect pattern that is deemed to have minimal impact or no impact in a manufacturing process/operation associated with the wafer defect map image. For example, a non-qualifying wafer defect map image may include a wafer defect map having a defective wafer die count (e.g., number of defective dies on the wafer) that is below a defective die count threshold (e.g., 5 defective dies, 20 defective dies, 28 defective dies, and/or the like). In one or more embodiments, non-qualifying wafer defect map images filtered by the filtering circuitry 402B may be stored in a database (e.g., wafer defect map database 316).

FIGS. 5A and 5B illustrates operational examples of non-qualifying wafer defect map images. FIG. 5A depicts an example spot wafer defect map and FIG. 5B depicts an example empty wafer defect map. As illustrated in FIGS. 5A and 5B, non-qualifying wafer defect map images may include wafer defect map images of spot wafer defect maps and wafer defect map images of empty wafer defect maps. A spot wafer defect map may describe a wafer defect map having defective dies with a defective die count that fails to satisfy the defective die count threshold, and an empty wafer defect map may describe a wafer defect map having no defective dies. In one or more embodiments, preprocessing the input wafer defect map images may reduce computation cost of the wafer defect map classification system 300.

However, it should be understood, that a person of ordinary skill in the relevant art will recognize that the set of wafer defect map images may not be resized and/or may not be filtered. For example, in one or more embodiments, the set of wafer defect map images may not be resized and may not be filtered. As another example, in one or more embodiments, the set of wafer defect map images may be resized but may not be filtered. In yet another example, in one or more embodiments, the set of wafer defect map images may not be resized but may be filtered. As a further example, in one or more embodiments, the set of wafer defect map images may be resized and may also be filtered.

In one or more example embodiments, the dimensionality reduction circuitry 404, in operation, generates reduced feature data (e.g., data points) for the preprocessed input set of wafer defect map images (or non-preprocessed set of wafer defect map images in embodiments where the set of wafer defect map images are not preprocessed) based at least in part on performing one or more dimension reduction operations. In one or more embodiments, the noted one or more dimension reduction operations may be performed to reduce the dimensional complexity of the preprocessed set of wafer defect map images (or non-preprocessed set of wafer defect map images in embodiments where the input set of wafer defect map images are not preprocessed). The reduced feature data may comprise feature data for the set of preprocessed wafer defect map images in a reduced dimensionality space.

In one or more example embodiments, the dimensionality reduction circuitry 404, in operation, generates the reduced feature data using a dimensionality reduction model, such as a non-linear dimensionality reduction machine learning model. In one or more embodiments, the dimensionality reduction circuitry 404, using the dimensionality reduction model receives as input a set of vector representations corresponding to the preprocessed set of wafer defect map images (or non-preprocessed set of wafer defect map images in embodiments where the set of wafer defect map images are not preprocessed). For example, each vector representation in the set of vector representations may comprise a vector representation for a particular preprocessed wafer defect map image in the set of wafer defect map images (or particular wafer defect map image in the set of non-preprocessed wafer defect map images in embodiments where the set of wafer defect map images are not preprocessed).

In one or more embodiments, the set of vector representations may be generated based at least in part on performing one or more of a flattening operation and/or reshaping operation on each of the preprocessed wafer defect map image in the preprocessed set of wafer defect map images (or wafer defect map image in the set of wafer defect map images that has not been preprocessed in embodiments where the set of wafer defect map images are not preprocessed). In one or more embodiments, a flattening operation may comprise applying a flattening technique to the data points (e.g., data values) found within a data object, such as a wafer defect map image, to transform the data object into a vector representation (e.g., one-dimensional array) of the data object by combining the data points. For example, in an instance in which a preprocessed wafer defect map image comprises a 61×61 pixels image, each preprocessed wafer defect map image may be transformed to a 3,721-vector representation. wherein each data point in the vector representation may represent a dimension in a related high-dimensional space as a total of 3,721 dimensions.

In one or more embodiments, the dimensionality reduction model may comprise a uniform manifold approximation and projection (UMAP) machine learning model. UMAP may describe a dimension reduction technique that creates an high dimensional connected graph and projects the graph into a low-dimensional space with substantially the same characteristics using Riemannian manifold. UMAP may approximate manifold on which the data is assumed to lie and may construct a fuzzy simplicial set representation of the approximated manifold. In one or more embodiments, the dimensionality reduction circuitry 404, using the UMAP machine learning model and based at least in part on the preprocessed set of wafer defect map images (or non-preprocessed wafer defect map images in embodiments where the set of wafer defect map images are nor preprocessed), may be configured to generate a high-dimensional weighted graph associated with the set of wafer defect map images (e.g., weighted graph that is associated with the preprocessed input set of wafer defect map images in a high dimensional space). For example, the dimensionality reduction circuitry 404, using the UMAP machine learning model, may generate a high-dimensional weighted graph based at least in part on the vector representations corresponding to the wafer defect maps. To generate the reduced feature data for the set of wafer defect map images (e.g., preprocessed wafer defect map images or non-preprocessed wafer defect map images), the dimensionality reduction circuitry 404, using the UMAP machine learning model, may generate a low-dimensional weighted graph based at least in part on the high-dimensional weighted graph (e.g., by projecting/reducing the high-dimensional weighted graph into a low-dimensional weighted graph). In one or more embodiments, the reduced feature data may comprise m×n matrix characterized, for example, by distances of m data points in a lower n dimensional space.

The data points of the preprocessed wafer defect map images (or non-preprocessed wafer defect map images) in the high dimensional space may be uniformly distributed in some examples. In some example embodiments, Riemann's metric $G_r$ may be applied, wherein the manifold M may be determined to be locally connected based at least in part on Riemann geometry theory responsive to the following being satisfied: (i) given a set of data uniformly distributed on the manifold M (with respect to the related Riemann's metric $G_r$), for each point in manifold M, there is a correlated point $G_r^p$ on a tangent space $T_p^M$ of the manifold M; and (ii) the noted Riemann's metric $G_r$ is locally constant (e.g., given a ball of fixed volume, Riemann's metric $G_r$ comprise the same number of points regardless of the position on the manifold M. For example, in some embodiments, Riemann's metric $G_r$ may be performed for purposes of uniform distribution of the wafer defect map images in the high dimensional space.

Figure 6A:
Figure 6B:
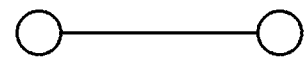
Figure 6C:
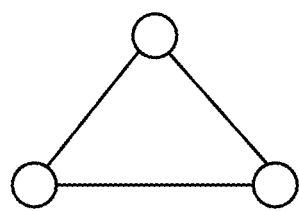
Figure 6D:
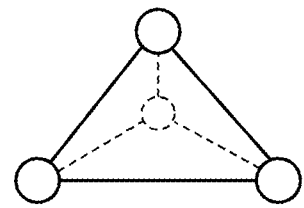

In one or more embodiments, to generate the high-dimensional weighted graph from the data points (e.g., uniformly distributed data points) of the vector representations of the wafer defect map images, a simplicial complex and/or a K-Nearest Neighbor (KNN) techniques can be employed. For example, in one or more example embodiments, the manifold M may be generated utilizing elements of a simplicial complex, including but not limited to points, line segments, triangles, and tetrahedrons. FIGS. 6A, 6B, 6C, and 6D illustrates examples of a point (0-simplex), a line segment (1-simplex), a triangle (3-simplex), and a tetrahedron (3-simplex) respectively. As shown in FIG. 6D, the various elements of simplicial complex can be connected together along edges to generate an n-dimensional object, wherein the edges may be associated with weights that describe or representative of a distance measure (e.g., distance measure between edges).

As noted above, in one or more embodiments, K-Nearest Neighborhood technique may be employed in generating the high-dimensional weighted graph. For example, the UMAP machine learning model may be used to generate the high-dimensional graph in accordance with a k-Nearest Neighbor (KNN) technique, wherein the constructed/generated high-dimensional weighted graph may be embodied as a k-complexity dependent and weighted graph. The k-complexity dependent and weight graph, for example, may be constructed/generated by varying the parameter "k" and connecting the edges. For example, a high-dimensional weighted graph generated using a small "k value may comprise a detailed graph-structure wherein data points are inside a dense region in the manifold, while a high-dimensional weighted graph generated using a large "k" value may comprise a less detailed graph-structure (e.g., a sparse-graph structure). FIG. 7 depicts an example of 2-dimensional KNN graph. For example, in an instance in which "k" is a circle radius around each data point in the high dimensional space, the circle radius can be increased or reduced to connect each data point with others. As depicted in FIG. 7, more or less data points 702 may be connected to the graph by varying the radius 704 (e.g., "k").

As noted, above, the edge weights of the high-dimensional weighted graph may correspond to (or otherwise may be indicative) of a distance measure between corresponding pair of data points, wherein a distance measure may refer to a distance between two data points. For example, a first pair of data points having a distance measure that is less than a distance measure for a second pair of data points may be associated with (e.g., may be assigned) edge weights that is greater than the edge weights for the second pair of data points. In one or more embodiments, the edge weights may be normalized based at least in part by associating a fuzzy topology representation of the high-dimensionality graph (e.g., k-nearest-based high-dimensionality graph), wherein the distance values may vary/change (e.g., between zero and one).

As described above, in one or more embodiments, the dimensionality reduction circuitry 404, using the UMAP machine learning model, may generate the reduced feature data (e.g., data points in low-dimensional space) based at least in part on generating (e.g., constructing) a low-dimensional weighted graph, wherein the low-dimensional weighted graph may be generated (e.g., constructed) based at least in part on the high-dimensional graph. FIG. 8 illustrates an example 2-dimensional low-dimensional graph associated with an example set of wafer defect maps. As depicted in FIG. 8 the data points 802 of the wafer defect maps images are represented in a low dimensional space (e.g., 2-dimensional space).

In one or more embodiments, generating the low-dimensional weighted graph comprises optimizing a cross-entropy-based function based at least in part on the edge weights of both the high-dimensional weighted graph and low-dimensional weighted graph (e.g., weights associated with the edges of both the high-dimensional weighted graph and low-dimensional weighted graph). In one or more embodiments, optimizing the cross-entropy-based function may comprise minimizing the cross-entropy measure. In one or more embodiments, the cross-entropy measure may be determined by performing the operations of the below equation:

$$\Theta(\mu, \upsilon, A) = \sum_{\alpha \in A} \overbrace{\mu(\alpha) \log\left(\frac{\mu(\alpha)}{\upsilon(\alpha)}\right)}^{\text{right group}} + + \underbrace{(1 - \mu(\alpha)) \log\left(\frac{1 - \mu(\alpha)}{1 - \upsilon(\alpha)}\right)}_{\text{right gap}} \quad \text{Equation 1}$$

In Equation 1 above: (i) $\Theta(\mu, v, A)$ may represent the cross-entropy measure; (ii) "A" may represent the set of data points in a high dimensional space (e.g., data points of the wafer defect map images in a high-dimensional space); (iii) $\mu$ and $v$ may represent related edge weights that may be defined in the space $\propto [0\ 1]$ (e.g., based at least in part on fuzzy representation). In one or more embodiments based on the optimization, a connected graph is associated with the low-dimensional space (e.g., the low-dimensional weighted graph).

In one or more embodiments, the clustering circuitry 406, in operation and in some examples, may analyze the reduced feature data (e.g., represented as data point features $\Theta$), using a clustering model, to generate one or more wafer defect pattern clusters. For example, the reduced feature data (e.g., represented as data point features $\Theta$) may be input to the clustering model. In some embodiments, the clustering model may comprise a density-based clustering machine learning model, such as a Hierarchical Density-Based Spatial Clustering of Applications with Noise (HDBSCAN) machine learning model. For example, in some embodiments, the clustering circuitry 406 may generate the one or more wafer defect pattern clusters using a HDBSCAN machine learning model, wherein the one or more wafer defect pattern clusters may comprise a density-based hierarchy of wafer defect pattern clusters. In one or more embodiments, each wafer defect map image (e.g., preprocessed wafer defect map image or non-preprocessed defect map image) may be associated with a particular wafer defect pattern cluster of the one or more wafer defect pattern clusters (e.g., each wafer defect map image may belong to a particular wafer defect pattern cluster of the one or more wafer defect pattern clusters).

In one or more embodiments, generating the one or more wafer defect pattern clusters using the HDBSCAN machine learning model may comprise determining mutual reachability distance measures $d_{mr}$ for pairs of core objects, wherein a core object may describe a given data point that is the center of a neighborhood that includes at least a defined minimum number (k) data points with respect to a distance threshold. For example, a data point (e.g., object) $a_p$ may be deemed a core object with respect to a distance threshold (e.g., radius r) and a smoothing factor $m_p$ if drawing a circumference (e.g., circle) with radius r and center $a_p$, the circumference includes at least a defined minimum number of data points (e.g., at least a defined minimum number of data points within the circumference). In one or more embodiments, the circumference for a given core object may be referred to as the r-neighborhood, wherein data points that are not within a r-neighborhood may be deemed noise.

In one or more embodiments, a pair of core objects may be deemed/determined to be r-reachable if data points in the pair of core objects are nested together (e.g., if each core object in the pair is part of the r-neighborhood of the other core object). In one or more embodiments, N core objects may be deemed to be density-connected if the noted N core objects are directly or transitively r-reachable. In one or more embodiments, a cluster (e.g., a wafer defect pattern cluster) can be defined with respect its radius r and smoothing factor $m_p$ as a non-empty subset of density-connected core objects. In one or more embodiments, a core distance $d_{core}$ of a core object with respect to its radius r and smoothing factor $m_p$ may describe the distance between the core object (e.g., data point) to its nearest neighbor (e.g., other data point). For example, the core distance for a give core object (e.g., data point) may represent the distance to the kth nearest neighbor (e.g., kth nearest data point) relative to the smoothing factor $m_p$. In one or more embodiments, a core object may be deemed a r-core object if the radius r is greater than or equal to the core distance of the core object.

In one or more embodiments, mutual reachability distance measure for a pair of core objects including core object $a_p$ and core object $a_q$ may describe the maximum value of the core distance $a_p$, core distance $a_q$, or the distance between the pair of core objects $a_p$ and $a_q$. In one or more embodiments, the mutual reachability distance measure $d_{mr}$ may be determined based at least in part on performing the operations of the below equation:

$$d_{mr}(a_p, a_q) = \max\{(d_{core}(a_p), d_{core}(a_q), d(a_p, a_q)\} \quad \text{Equation 2}$$

In Equation 2 above: (i) $d_{mr}(a_p, a_q)$ may represent the mutual reachability distance measure between core object $a_p$ and core object $a_q$; (ii) $d_{core}(a_p)$ may represent core distance for core object $a_p$; (iii) $d_{core}(a_q)$ may represent core distance for core object $a_q$; and (iv) $d(a_p, a_q)$ may represent the distance between core object $a_p$ and core object $a_q$. For example, given a core object $a_p$ and core object $a_q$, if $d_{core}(a_p)=0.45$, $d_{core}(a_q)=0.25$, and the distance between core object $a_p$ and core object $a_q$ (e.g., $d(a_p, a_q)$)=0.58, then the mutual reachability distance measure for the pair of core objects $a_p$ and $a_q$ may be determined to be 0.58.

In one or more embodiments, the clustering circuitry 406 using the HDBSCAN machine learning model may generate (e.g., construct) a mutual reachability graph based at least in part on the mutual reachability distance measure for pairs of core objects. In one or more embodiments, the mutual reachability graph may describe a weighted graph characterized by vertices and edges, wherein the data points represent vertices and an edge between a pair of data points is associated with the mutual reachability distance measure for the pair of data points. For example, a mutual reachability graph may describe a weighted graph with the datapoints configured as graph-vertices, and wherein for each edge (e.g., datapoints connection), the weights may be defined as a measure of the mutual reachability distance of related datapoints. In one or more embodiments, the mutual reachability graph may be densely connected.

In one or more embodiments, the clustering circuitry 406, using the HDBSCAN machine learning model, may generate an optimized graph based at least in part by optimizing the number of connection-complexity with respect to the mutual reachability graph. In some embodiments, the optimized graph may be generated in accordance with a minimum spanning tree (MST) technique.

FIG. 9 illustrates an example of an optimized graph (depicting wafer defect pattern clusters 902) based at least in part on a minimum spanning tree. In one or more embodiments, minimum spanning tree may be configured to enable transformation of a densely connected graph, such as a densely connected mutual reachability graph to an optimized graph (as shown in the illustrated example of FIG. 9), wherein the sum of edge weights of the optimized graph may comprise a minimum sum of edge weights that may be obtained. For example, in one or more embodiments, generating the optimized graph in accordance with the noted minimum spanning tree technique may comprise reconfiguring and/or reducing in complexity the densely connected mutual reachability graph based at least in part on a classical graph-theory.

In one or more embodiments, the clustering circuitry 406, using the HDBSCAN machine learning model, may generate a hierarchical cluster graph based at least in part on the optimized graph (e.g., optimized mutual reachability graph). The hierarchical cluster graph may highlight the groups of clusters associated with wafer defect patterns in the input set of wafer defect map images. In one or more embodiments, generating the hierarchical cluster graph may comprise identifying and/or extracting a set of wafer defect pattern clusters based at least in part on an optimal number of clusters. In one or more embodiments, identifying and/or extracting the set of wafer defect pattern clusters based at least in part on the optimal number of clusters may comprise applying an "excess of mass" technique. In one or more embodiments, the output of the clustering circuitry 406 with respect to the input set of wafer defect images may comprise a set of core objects representing the set of optimized clusters (e.g., the optimal number of clusters).

FIG. 10 illustrates an example, application of an "excess of mass" technique. In some embodiments, the "excess of mass" technique may comprise increasing and/or decreasing a density measure $\lambda=1/d_{core}$, wherein one or more splitting operations and/or merging operations may be performed with respect to wafer defect pattern clusters Ct. For example, wafer defect pattern clusters CL may be split and/or merged based at least in part on $\lambda_i$. In one or more embodiments, the set of wafer defect pattern clusters corresponding to the optimal number of clusters CL may be determined based at least in part on performing the operations of the below equation:

$$E_{dm}(C_i) = \int_{x \in C_i} (f(x) - \lambda_{min}(C_i))dx \qquad \text{Equation 3}$$

In Equation 3 above: (i) $\lambda_{min}$ may represent a minimum density measure associated with wafer defect pattern cluster $C_i$. A plurality of hierarchical cluster merging operations may be performed to identify and/or extract the optimal wafer defect pattern clusters. For example, two clusters $C_1$ and $C_2$ may be merged at a corresponding minimum density measure $\lambda_{min}$ to generate cluster $C_3$, and cluster $C_3$ may be merged with cluster $C_4$ at a corresponding minimum density measure $\lambda_{i+1}$. In the noted example, additional hierarchical cluster merging operations may be performed to identify and/or extract the optimal wafer defect pattern clusters (e.g., set of optimal wafer defect pattern clusters).

In one or more embodiments, the clustering circuitry 406, in operation, associates the set of optimal wafer defect pattern clusters 1102 with the corresponding data points as illustrated in FIG. 11. To do this, the clustering circuitry 406 may map the identified wafer defect pattern clusters back to the UMAP (as described above). A given wafer defect pattern cluster may represent a grouping of wafer defect map images that have similar features (e.g., high-relevance similar features). As depicted in FIG. 11, wafer defect map images having substantially similar features (e.g., substantially significant similar features) are grouped together, wherein each group represents a wafer defect pattern cluster 1102 of a plurality of wafer defect pattern clusters 1102.

In one or more embodiments, the classifier circuitry 408, in operation, generates a classification prediction for each wafer defect map image (e.g., preprocessed wafer defect map image or non-preprocessed wafer defect map image) based at least in part on the particular wafer defect pattern cluster associated with the respective wafer defect map image. In one or more embodiments, the classification prediction may comprise a metric-driven classification. As described above, in one or more embodiments, each wafer defect map image (e.g., preprocessed wafer defect map image or non-preprocessed defect map image) may be associated with a particular wafer defect pattern cluster of the one or more generated wafer defect pattern clusters (e.g., plurality of wafer defect pattern clusters). In one or more embodiments, generating a classification prediction for each preprocessed wafer defect map image may comprise assigning a label to each wafer defect pattern cluster, and associating the respective preprocessed wafer defect map image with the label for the wafer defect pattern cluster associated with the respective preprocessed wafer defect map.

In one or more embodiments, the classifier circuitry 408, in operation, analyzes the wafer defect pattern clusters with respect to candidate wafer defect pattern classes (e.g., stored in a wafer defect pattern class database) to determine if an identified wafer defect pattern cluster represents an additional wafer defect pattern class (e.g., if one or more identified wafer defect pattern clusters is unclassified). In one or more embodiments, analyzing a wafer defect pattern cluster with respect to candidate wafer defect pattern clusters may comprise comparing a cluster representative for the wafer defect pattern cluster with each candidate class representative of a set of one or more candidate class representatives (e.g., comparing the wafer defect pattern cluster representative with each candidate class representative of a plurality of candidate class representatives).

In one or more embodiments, the cluster representative for the identified wafer defect pattern clusters may be determined based at least in part on identifying a centroid for each wafer defect pattern cluster using one or more of a variety of techniques. For example, in one or more embodiments, a cluster representative for a given wafer defect pattern cluster may be identified based at least in part on applying a K-means measure (e.g., K=1, and/or the like). In one or more embodiments, the candidate class representatives for the candidate wafer defect pattern classes may be determined based at least in part on identifying a centroid for each candidate wafer defect pattern class using one or more of a variety of techniques. For example, in one or more embodiments, a candidate class representative for a given candidate wafer defect pattern class may be identified based at least in part on applying a K-means measure (e.g., K=1, and/or the like).

In one or more embodiments, to the classifier circuitry 408, in operation, compares a cluster representative with a candidate class representative based at least in part on similarity measure, wherein the similarity measure may be a degree of similarity between a cluster representative and a candidate class representative. In one or more embodiments, the classifier circuitry 408, in operation, generates a set of pattern similarity scores for each cluster representative based at least on the noted similarity measure. Each similarity score in the corresponding set of pattern similarity scores for a given cluster representative may correspond to a pattern similarity score between the cluster representative and a candidate class representative. In one or more embodiments, the similarity measure may be a cosine similarity measure. In one or more embodiments, the similarity score for a given pair of cluster representative and candidate class representative may be determined based at least in part on performing the operations of the below equation:

$$\cos(\theta) = \frac{WDM_{new} \times WDM_{DB}}{\|WDM_{new}\| \times \|WDM_{DY}\|} \quad \text{Equation 4}$$

In Equation 4 above: (i) cos ($\theta$) may represent the similarity measure (ii) $WDM_{new}$ may represent the K-means cluster centroid for a given wafer defect pattern cluster; (iii) $WDM_{DB}$ may represent the K-means class centroid for a candidate wafer defect pattern class.

In one or more embodiments, for each cluster representative, the classifier circuitry 408 compares each similarity score in the corresponding set of pattern similarity scores for the cluster representative with a similarity score threshold. In one or more embodiments, the classifier circuitry 408 may, responsive to each similarity score in the set of pattern similarity scores for the cluster representative failing to satisfy (e.g., not exceeding, and/or the like) the similarity score threshold, adopt the cluster representative as an additional wafer defect pattern class. In one or more embodiments, the classifier circuitry 408 may, responsive to a similarity score in the set of pattern similarity scores for the cluster representative satisfying (e.g., exceeding, and/or the like) the similarity score threshold, associate each wafer defect map image belonging to the wafer defect pattern cluster represented by the cluster representative with the corresponding candidate wafer defect pattern class. The corresponding candidate wafer defect pattern class may comprise the candidate wafer defect map represented by a candidate class representative associated with a similarity measure that satisfies the similarity score threshold. For example, in an instance in which the similarity score range is [−1 1], wherein "−1" represents high dissimilarity of a representative pair, "1" represents high similarity of a representative pair, the similarity score threshold is 0.90, the set of candidate class centroids includes $\{WDM_{DB}^1, WDM_{DB}^2, WDM_{DB}^3\}$, and the set pattern similarity scores for a cluster representative $WDM_{new}^1$ are $\cos(WDM_{new}^1, WDM_{DB}^1)=0.95$, $\cos(WDM_{new}^1, WDM_{DB}^2)=0.4$, and $\cos(WDM_{new}^1, WDM_{DB}^3)=0.5$, then $WDM_{new}^1$ may be determined as belonging to the candidate class $WDM_{DB}^1$ and each wafer defect map images belonging to the cluster $WDM_{new}^1$ may be classified as belonging to the candidate class $WDM_{DB}^1$. In some embodiments, a cluster representative may be determined as belonging to more than one candidate class. As another example, in an instance in which the similarity score range is [−1 1], wherein "−1" represents high dissimilarity of a representative pair, "1" represents high similarity of a representative pair, the similarity score threshold is 0.90, the set of candidate class centroids includes $\{WDM_{DB}^1, WDM_{DB}^2, WDM_{DB}^3\}$, and the set of pattern similarity scores for a cluster representative $WDM_{new}^2$ are $\cos(WDM_{new}^2, WDM_{DB}^1)=0.4$, $\cos(WDM_{new}^2, WDM_{DB}^2,)=0.2$ and $\cos(WDM_{new}^2, WDM_{DB}^3)=0.15$, then $WDM_{new}^2$ may be determined as belonging to an additional defect pattern class (e.g., not belonging to any of the candidate defect pattern classes).

As described above, in one or more embodiments, generating a classification prediction for each preprocessed (or non-preprocessed) wafer defect map image may comprise assigning a label to each wafer defect pattern cluster, and associating the respective wafer defect map image with the label for the wafer defect pattern cluster associated with the respective wafer defect map. In one or more embodiments, assigning a label to a wafer defect pattern cluster may comprise, for wafer defect pattern clusters whose cluster representative is determined to be a qualifying cluster representative based at least in part on association with at least one pattern similarity score that satisfies the pattern similarity score threshold, adopting the label associated with the corresponding candidate class representative as the label for the wafer defect pattern cluster. A qualifying cluster representative may describe a cluster representative wherein at least one pattern similarity score of the set of pattern similarity scores associated with the cluster representative satisfies the pattern similarity score threshold.

In one or more embodiments, assigning a label to a wafer defect pattern cluster may comprise, for wafer defect pattern clusters whose cluster representative is determined to be a non-qualifying cluster representative based at least in part on association with each pattern similarity score failing to satisfy the pattern similarity score threshold, adopting a unique label (e.g., that is different for each label for candidate wafer defect pattern classes). A non-qualifying cluster representative may describe a cluster representative wherein none of the pattern similarity score of the set of pattern similarity scores associated with the cluster representative satisfies the pattern similarity score threshold.

FIG. 12 illustrates an embodiment of a supervised classification system 1200, which may be employed for example, as the supervised classifier circuitry 408 associated with the wafer defect map classification system 300. The supervised classification system 1200 may be configured to operate in a plurality of phases. In one or more embodiments, the plurality of phases may comprise one or more of: a training phase, a testing phase, or a classification phase. Some example embodiments may store a trained model and, in operation, employ only the classification phase. The supervised classification system 1200 can receive as input wafer defect pattern classes stored in a database, such as the wafer defect pattern class databases.

The supervised classification system 1200 as illustrated may comprise a deep neural network 1201 (e.g., deep convolutional neural network) having a plurality of layers including resizing layer 1202, convolutional layers 1204-1212, rectified liner unit (Relu) convolutional layers (not shown), max pooling layers (not shown), and fully connected layers 1220, 1222. Furthermore, the supervised classification system 1200 as illustrated may include a processing circuitry 1216 (also referred to as processors, processing element, and/or similar terms used herein interchangeably), and one or more memories 1218, which may be used to implement the functionality of the layers of the supervised classification system 1200. The system 1200 as illustrated may also comprises one or more bus systems, and may include additional circuitry, such as power supplies, interfaces, etc., which are omitted for ease of illustration. For example, the system 1200 may include one or more communications interfaces for communicating with various computing entities, such as by communicating data, content, information, and/or similar terms used herein interchangeably that can be transmitted, received, operated on, processed, displayed, stored, and/or the like. In one embodiment, the system 1200 can include or otherwise be in communication with a processing circuitry 1216 that communicate with other elements/circuitry within the system 1200 via a bus, for example. As will be understood, the processing circuitry 1216 may be embodied in a number of different ways.

For example, the processing circuitry 1216 may be embodied as one or more complex programmable logic devices (CPLDs), microprocessors, multi-core processors, coprocessing entities, application-specific instruction-set processors (ASIPs), microcontrollers, and/or controllers. Further, the processing circuitry 1216 may be embodied as one or more other processing devices or circuitry. The term circuitry may refer to an entirely hardware embodiment or a combination of hardware and computer program products. Thus, the processing circuitry 416 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing circuitry 1216 may be configured for a particular use or configured to execute instructions stored in volatile or non-volatile media or otherwise accessible to the processing circuitry 1216. As such, whether configured by hardware or computer program products, or by a combination thereof, the processing circuitry 1216 may be capable of performing steps or operations according to embodiments of the present disclosure when configured accordingly.

In one embodiment, the system 1200 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In a training phase and in some examples, the system 1200 may receive a set of wafer defect map images including associated labels (e.g., wafer defect pattern classes) and optionally tags. In a testing and classification phase, the system may receive wafer defect maps, which may include associated tag information, such as the machines used to process the wafer. In some examples and in the testing and classification phase, the labels identifying a wafer defect pattern class and the tag information identifying a root defect cause may be missing/omitted. In the training phase, the supervised classification system 1200 may generate/train, based at least in part on the labeled wafer defect map images (e.g., labeled wafer defect map training data), a machine learning model configured for mapping input wafer defect map images to labels identifying defect pattern classes (e.g., wafer defect pattern classes) and, in some embodiments, to tags associated with root defect causes. In the testing and classification phases, the supervised classification system 1200 may output a set of labels (e.g., wafer defect pattern classes) and tags associated with the input wafer defect map images.

An example convolutional layer may comprise a small matrix sliding over an input image, and, in operation, may have a kernel size of, for example, 3×3, and respective dimensionalities of an output space of 64, 128, 256, and 512 (e.g., the number of output filters in the convolutions may respectively be 64, 128, 256, 512, and 512. For example, as illustrated in FIG. 12, the deep neural network may include convolutional layers 1204-1212 (e.g., 5 convolutional layers) that each have a kernel size of 3×3. For each convolutional layer, in operation, a rectified liner unit (Relu) activation function may be applied followed by batch normalization. In one or more embodiments, the number of kernels may be doubled at one or more convolutional layers starting from 64 until 512. For example, the number of kernels for the first convolutional layer 1204 may be 64, the number of kernels for the second convolutional layer 1206 may be 128, the number of kernels for the third convolutional layer 1208 may be 256, the number of kernels for the fourth convolutional layer 1210 and the fifth convolutional layer 1212 may each be 512. It should be understood, however, that a person of ordinary skill in the relevant art will recognize that the deep convolutional network may comprise one or more of a variety of configurations (e.g., different number of convolutional layers, different kernel size, different number of kernels, and/or the like). In one or more embodiments, the convolutional neural network may comprise input layers at 224×224×3 as data resolution/channels, and a final stack/set of two fully connected layers 1220, 1222 characterized by 100, 352, and 1,024 neurons respectively. In one or more embodiments, the convolutional neural network may comprise a single input layer (e.g., single-channel input layer) at 64×64, and a final stack/set of two fully connected layers 1220, 1222 characterized by 8, 192, and 1,024 neurons respectively.

Training may be accelerated, in some examples, by introducing non-linearity. The max pooling convolutional layers, in operation, may downsample, reducing the parameters and addressing overfitting. The fully connected layers 1220, 1222, in operation, may connect every neuron in one layer to every neuron in another layer, and determine which features most correlate to one or more particular classes. The fully connected layers 1220, 1222 may receive an input volume (the output of the preceding layer) and output an m-dimensional vector, where m is the number of classes that the model has available to choose from. In the example of FIG. 2, m=12+n, where n is the number of additional classes identified. The last fully connected layer 1222 generates a feature vector, which may be provided to an activation function, wherein the activation function, in operation, performs the classification, and outputs a label, which may indicate the wafer defect pattern class, the root cause, or both.

The activation function 1212, in operation, may be, for example, a softmax function, in which case an input wafer defect map image may be associated to the maximum correlation, or a sigmoid function, in which case an input wafer defect map image may be associated to multiple labels (e.g., all the labels having a correlation above a threshold value). The activation function 1212, in operation, may perform the classification, and may output labels, which may indicate the class, the root cause, or both.

Embodiments of the system 1200 may comprise more or fewer layers and circuits than illustrated, and layers and circuits may be combined and separated into additional layers and circuits in various manners. For example, other types of pooling layers may be employed, such as average pooling layers.

FIG. 13 illustrates an embodiment of a method 1300, which may be employed, for example, by the embodiment of the system 300 of FIG. 3, by the embodiment of the system 400 of FIG. 4 to identify additional wafer defect pattern classes, by the example embodiment of the system 1200 of FIG. 12 to classify wafer defect maps to identify additional wafer defect pattern classes and/or classify wafer defect maps. The method 1300 starts at 1302. The method 1300 may be started, for example, as part of a wafer manufacturing quality control process.

At step/operation 1304, the wafer defect map classification system receives or retrieves a set of wafer defect maps as input. The wafer defect maps in the set of wafer defect maps may be generated by a wafer manufacturing quality control system or process. The wafer defect maps may be represented as wafer defect map images. In one or more embodiments, the wafer defect map images may be high-resolution wafer defect map images. For example, the wafer defect map images may have a 20,000×20,000 spatial resolution.

At step/operation 1306, the wafer defect map classification system performs one or more preprocessing operations on the set of wafer defect map images. In one or more embodiments, the set of wafer defect map images may be preprocessed (e.g., by the preprocessing circuitry of the system 400) using an image preprocessing framework that comprises a resizing model configured to reduce the spatial dimension of a wafer defect map image (e.g., a high-resolution wafer defect map image) and/or a filtering model configured to filter out non-qualifying wafer defect map images based at least in part on performing one or more filtering operations. In one or more embodiments, step/operation 1306 may be an optional step. For example, in one or more embodiments, the resizing operation and/or the filtering operation may be optional. As another example, in one or more embodiments, the step/operation 1306 may be performed in accordance with the process that is depicted in FIG. 14, which is an example process for preprocessing wafer defect maps.

The process that is depicted in FIG. 14 may begin at step/operation 1402, when the unsupervised classification circuitry, reduces the spatial dimension for each wafer defect map image in the set of wafer defect map images (e.g., as described above).

At step/operation 1404, the wafer defect map classification system performs one or more filtering operations to remove non-qualifying wafer defect map images from the set of wafer defect map images (e.g., as described above).

Returning to FIG. 13 at step/operation 1308, the wafer defect map classification system generates vector representations for the set of wafer defect map images based at least in part by performing a flattening operation and/or reshaping operation on each wafer defect map image in the set of wafer defect map images (e.g., as described above).

At step/operation 1310, the wafer defect map classification system generates using a non-linear dimensionality reduction machine learning model and based at least in part the vector representations for the set of wafer defect map images, reduced feature data, wherein the reduced feature data comprises feature data for the set of wafer defect map images in a reduced dimensionality space. In one or more embodiments, the non-linear dimensionality reduction machine learning model may comprise a UMAP machine learning model. In one or more embodiments, the reduced feature data may be generated as described above.

At step/operation 1312, the wafer defect map classification system generates using a density-based clustering machine learning model and based at least in part on the reduced feature data, one or more wafer defect pattern clusters. In one or more embodiments, the density-based clustering model may comprise a HDBSCAN machine learning model. In one or more embodiments, the one or more wafer defect pattern clusters (e.g., set of wafer defect pattern clusters) may be generated as described above.

At step/operation 1314, the wafer defect map classification system generates a classification prediction for each wafer defect map image based at least in part on the particular wafer defect pattern cluster associated with the respective wafer defect map image. In one or more embodiments, the wafer defect pattern clusters may be generated (e.g., by the clustering circuitry of the system 400) using a density-based clustering model, such as an HDBSCAN machine learning model. In one or more embodiments, the step/operation 1314 may be performed in accordance with the step/operation that is depicted in FIG. 15 which is an example process for generating a classification prediction.

The process that is depicted in FIG. 15 may begin at step/operation 1502 when the wafer defect map classification system assigns a label to each wafer defect pattern cluster (e.g., as described above).

At step/operation 1504, the wafer defect map classification system associates the respective wafer defect map image with the label for the wafer defect pattern cluster associated with the respective wafer defect map (e.g., as described above).

Returning to FIG. 13 at step/operation 1316, the wafer defect map classification system updates a wafer defect pattern class corpus. In one or more embodiments, the wafer defect map classification system may update the wafer defect pattern corpus based at least in part on identifying/determining additional wafer defect pattern classes. In one or more embodiments, the additional wafer defect pattern classes may be identified/determined based at least in part on a similarity measure, such as a cosine similarity measure. For example, in one or more embodiments, an additional wafer defect pattern class may be identified based at least in part on each similarity score (e.g., pattern similarity score) associated with a cluster representative for a wafer defect pattern cluster failing to satisfy a similarity score threshold. In some embodiments, the step/operation 1316 may be performed in accordance with the step/operation that is depicted in FIG. 16, which is an example process for updating a wafer defect pattern corpus is response to identifying/determining additional wafer defect patterns.

The process that is depicted in FIG. 16 may begin at step/operation 1602 when the wafer defect map classification system identifies a cluster representative for each wafer defect pattern cluster of the one or more wafer defect pattern clusters. Each cluster representative may represent a subset of identified wafer defect patterns of one or more identified wafer defect patterns. Each subset of identified wafer defect may comprise identified wafer defect patterns having substantially similar features. As described above, the one or more identified wafer defects patterns may be identified based at least in part on the input set of wafer defect map images. For example, each wafer defect pattern may correspond to one or more wafer defect map images in the input set of wafer defect map images.

At step/operation 1604, the wafer defect map classification system, for each cluster representative, generates, based at least in part on a set of candidate class representatives, one or more pattern similarity scores (e.g., a set of pattern similarity scores). Each candidate class representative may represent a group of candidate wafer defect patterns having substantially similar features.

At step/operation 1606, the wafer defect map classification system updates, based at least in part on association of each pattern similarity score of a given set of pattern similarity scores with a non-qualifying pattern similarity score, the wafer defect pattern class corpus. A non-qualifying pattern similarity score may describe a similarity score that fails to satisfy the pattern similarity score threshold. For example, the wafer defect map classification system may update the wafer defect pattern class corpus in response to identifying one or more cluster representatives whose pattern similarity scores each fail to satisfy the pattern similarity score threshold. Each cluster representatives whose pattern similarity scores each fail to satisfy the pattern similarity score threshold may be identified/adopted as an additional wafer defect pattern class. In one or more embodiments, updating the wafer defect pattern corpus may comprise storing the identified additional wafer defect pattern class(es) in a wafer defect pattern class database.

Returning to FIG. 13 at step/operation 1318, the wafer defect map classification system trains, fine-tunes, or retrains, based at least in part on the updated wafer defect pattern class corpus, a convolutional neural network machine learning model, where the convolutional neural network machine learning model may be configured to generate classification predictions for wafer defect maps. For example, in one or more embodiments, the wafer defect map classification system may fine-tune, re-train, or train, a machine learning model, for example, by using a classification system, such as the supervised classification system 1200 of FIG. 12. In one or more embodiments, the wafer defect map classification system may, for example, fine-tune, re-train, or train a machine learning model (such as a convolutional neural network machine learning model) on the updated wafer defect pattern class corpus, where the updated wafer defect pattern corpus may comprise candidate wafer defect pattern classes (e.g., previously identified wafer defect pattern classes) and identified additional wafer defect pattern classes. In one or more embodiments, each wafer defect pattern class in the updated wafer defect map pattern corpus may comprise a label for one or more wafer defect map images in a wafer defect map training data used to fine-tune/re-train/train the noted machine learning model.

At 1320, the wafer defect map classification system (e.g., optionally) may perform further processing based on the classification of the wafer defect map images. For example, when a wafer defect map image is classified into particular wafer defect pattern classes, a warning signal may be generated. In another example, a count of wafer defect map images in a wafer defect pattern class may be incremented, and further action taken when the count exceeds a threshold value. In one or more embodiments, statistical analysis may be performed in determining whether to perform further processing based at least in part on the classification of the wafer defect map images.

Embodiments of methods of classifying wafer defect maps may contain additional acts not shown in FIG. 13, may not contain all of the acts shown in FIG. 13, may perform steps/operations shown in FIG. 13 in various orders, and may be modified in various respects. For example, the method 1300 may perform step/operation 1318 after a set of wafer defect maps is processed or periodically, instead of or in addition to performing step/operation 1318 individually for each wafer defect map. In another example, the method 1300 may process wafer defect maps in parallel, etc.

FIG. 17 illustrates an embodiment of a method 1700, which may be employed, for example, by the embodiment of the system 1200 of FIG. 12 to classify wafer defect maps based at least in part on the corresponding wafer defect map images for the wafer defect maps. The method 1700 starts at 1702. The method 1700 may be started, for example, as part of a wafer manufacturing quality control process.

At step/operation 1704, the wafer defect map classification system receives or retrieves one or more wafer defect maps. The wafer defect maps may be generated by a wafer manufacturing quality control system or process. The wafer defect maps may be represented as wafer defect map images.

At step/operation 1706, the wafer defect map classification system classifies the wafer defect map images based on a set of candidate wafer defect pattern classes (e.g., labels) into which a wafer defect map may be classified. In one or more embodiments, the wafer defect pattern classes may be an updated set of wafer defect pattern classes (e.g., updated wafer defect pattern class corpus) that is updated based at least in part on the method 1300 of FIG. 13.

At step/operation 1708, the wafer defect map classification system (e.g., optionally) performs further processing based on the classification of the image. For example, when the wafer defect map images are classified into particular classes, a warning signal may be generated. In another example, a count of wafer defect map images in a wafer defect pattern class may be incremented, and further action taken when the count exceeds a threshold value. In one or more embodiments, statistical analysis may be performed in determining whether to perform further processing based on the classification of the wafer defect map images. In one or more embodiments, the wafer defect map classification system determines whether the classification of wafer defect maps is finished (e.g., whether there are additional wafer defect maps to process). When it is determined that classification of wafer defect maps is not finished, the method 1700 may return to 1704 to receive or retrieve the next wafer defect map. When it is determined at 1710 that the processing of wafer defect maps is finished, further processing may be performed, such as a return of the results of classifying a set of wafer defect maps.

Embodiments of methods of classifying wafer defect maps may contain additional acts not shown in FIG. 17, may not contain all of the acts shown in FIG. 17, may perform step/operation shown in FIG. 17 in various orders, and may be modified in various respects. For example, the method 1700 may perform step/operation 1708 after a set of wafer defect maps is processed or periodically, instead of or in addition to performing step/operation 1708 individually for each wafer defect map. In another example, the method 1700 may process wafer defect maps in parallel, etc.

FIG. 18 provides an illustrative schematic representative of an external computing entity 1800 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 1800 can be operated by various parties. As shown in FIG. 18, the external computing entity 1800 can include an antenna 1812, a transmitter 1804 (e.g., radio), a receiver 1806 (e.g., radio), and a processing element 1808 (e.g., CPLDs, microprocessors, multi-core processors, coprocessing entities, ASIPs, microcontrollers, and/or controllers) that provides signals to and receives signals from the transmitter 1804 and receiver 1806, correspondingly.

The signals provided to and received from the transmitter 1804 and the receiver 1806, correspondingly, may include signaling information/data in accordance with air interface standards of applicable wireless systems. In this regard, the external computing entity 1800 may be capable of operating with one or more air interface standards, communication protocols, modulation types, and access types. More particularly, the external computing entity 1800 may operate in accordance with any of a number of wireless communication standards and protocols. In a particular embodiment, the external computing entity 1800 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 1800 may operate in accordance with multiple wired communication standards and protocols via a network interface 1820.

Via these communication standards and protocols, the external computing entity 1800 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 1800 can also download changes, add-ons, and updates, for instance, to its firmware, software (e.g., including executable instructions, applications, program modules), and operating system.

According to one embodiment, the external computing entity 1800 may include location determining aspects, devices, modules, functionalities, and/or similar words used herein interchangeably. For example, the external computing entity 1800 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the external computing entity 1800 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 1800 may also comprise a user interface (that can include a display 1816 coupled to a processing element 1808) and/or a user input interface (coupled to a processing element 1808). For example, the user interface may be a user application, browser, user interface, and/or similar words used herein interchangeably executing on and/or accessible via the external computing entity 1800 to interact with and/or cause display of information/data from a wafer defect map classification system, as described herein. The user input interface can comprise any of a number of devices or interfaces allowing the external computing entity 1800 to receive data, such as a keypad 1818 (hard or soft), a touch display, voice/speech or motion interfaces, or other input device. In embodiments including a keypad 1818, the keypad 1818 can include (or cause display of) the conventional numeric (0-9) and related keys (#, *), and other keys used for operating the external computing entity 1800 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 1800 can also include volatile storage or memory 1822 and/or non-volatile storage or memory 1824, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 1800. As indicated, this may include a user application that is resident on the entity or accessible through a browser or other user interface for communicating with the wafer defect map classification system.

In various embodiments, the external computing entity 1800 may be embodied as an artificial intelligence (AI) computing entity, such as an Amazon Echo, Amazon Echo Dot, Amazon Show, Google Home, and/or the like. Accordingly, the external computing entity 1800 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

Further, while this detailed description has set forth some embodiments of the present disclosure, the appended claims may cover other embodiments of the present disclosure which differ from the described embodiments according to various modifications and improvements. For example, in some embodiments, one or more of a variety of dimensionality reduction machine learning models may be utilized. As another example, one or more a variety of density-based clustering machine learning models may be utilized.

Further, within the appended claims, unless the specific terms "means for" or "step for" is used within a given claim, it is not intended that the claim be interpreted under 35 U.S.C. § 112, paragraph (f).

The invention claimed is:

1. A device, comprising:
one or more processors; and
an unsupervised classification circuitry, configured to execute one or more instructions to:
generate, using a non-linear dimensionality reduction machine learning model and based at least in part on vector representations for a set of wafer defect map images, reduced feature data, wherein the reduced feature data comprises feature data for the set of wafer defect map images in a reduced dimensionality space;
generate, using a density-based clustering machine learning model and based at least in part on the reduced feature data, one or more wafer defect pattern clusters, wherein each wafer defect map image is associated with a particular wafer defect pattern cluster of the one or more wafer defect pattern clusters;
generate a classification prediction for each wafer defect map image based at least in part on the particular wafer defect pattern cluster associated with the respective wafer defect map image;
identify a cluster representative for each wafer defect pattern cluster of the one or more wafer defect pattern clusters; and
for each cluster representative:
generate, based at least in part on a set of candidate class representatives, one or more pattern similarity scores, wherein:
each pattern similarity score corresponds to a representative pair of one or more representative pairs, and
each representative pair comprises the cluster representative and a particular candidate class representative from the set of candidate class representatives; and
update based at least in part on association of each pattern similarity score with a non-qualifying pattern similarity score, a wafer defect pattern class corpus.

2. The device of claim 1, wherein the set of wafer defect map images comprise preprocessed wafer defect map images.

3. The device of claim 2, wherein the unsupervised classification circuitry, is configured to execute the one or more instructions to generate the preprocessed wafer defect map images by (i) reducing a spatial dimension for each wafer defect map image in the set of wafer defect map images, and (ii) performing one or more filtering operations to remove non-qualifying wafer defect map images from the set of wafer defect map images.

4. The device of claim 1, wherein the unsupervised classification circuitry is configured to execute the one or more instructions to generate the vector representations for the set of wafer defect map images based at least in part by performing a flattening operation on each wafer defect map image in the set of wafer defect map images.

5. The device of claim 1, wherein:
the non-linear dimensionality reduction machine learning model is a Uniform Manifold Approximation and Projection machine learning model; and
the unsupervised classification circuitry is configured to execute the one or more instructions to generate the reduced feature data by performing Uniform Manifold Approximation and Projection on the vector representations for the set of wafer defect map images.

6. The device of claim 1, wherein:
the density-based clustering machine learning model is a Hierarchical Density-Based Spatial Clustering of Applications with Noise (HDBSCAN) machine learning model.

7. The device of claim 1, wherein the unsupervised classification circuitry is configured to execute the one or more instructions to generate the classification prediction for each wafer defect map image by (i) assigning a label to each wafer defect pattern cluster, and (ii) associating the respective wafer defect map image with the label for the wafer defect pattern cluster associated with the respective wafer defect map.

8. The device of claim 1, wherein the unsupervised classification circuitry is configured to execute the one or more instructions to update the wafer defect pattern class corpus by updating a wafer defect pattern class database.

9. The device of claim 1, further comprising:
a supervised classification circuitry, configured to execute one or more instructions to:
train, based at least in part on the updated wafer defect pattern class corpus, a convolutional neural network machine learning model configured to generate classification predictions for wafer defect maps.

10. A system, comprising:
one or more memories; and
an unsupervised classification circuitry, configured to execute one or more instructions to:
generate, using a non-linear dimensionality reduction machine learning model and based at least in part on vector representations for a set of wafer defect map images, reduced feature data, wherein the reduced feature data comprises feature data for the set of wafer defect map images in a reduced dimensionality space;
generate, using a density-based clustering machine learning model and based at least in part on the reduced feature data, one or more wafer defect pattern clusters, wherein each wafer defect map image is associated with a particular wafer defect pattern cluster of the one or more wafer defect pattern clusters;
generate a classification prediction for each wafer defect map image based at least in part on the particular wafer defect pattern cluster associated with the respective wafer defect map image;
identify a cluster representative for each wafer defect pattern cluster of the one or more wafer defect pattern clusters; and
for each cluster representative:
generate, based at least in part on a set of candidate class representatives, one or more pattern similarity scores, wherein:
each pattern similarity score corresponds to a representative pair of one or more representative pairs, and
each representative pair comprises the cluster representative and a particular candidate class representative from the set of candidate class representatives; and
update based at least in part on association of each pattern similarity score with a non-qualifying pattern similarity score, a wafer defect pattern class corpus.

11. The system of claim 10, wherein the set of wafer defect map images comprises preprocessed wafer defect map images.

12. The system of claim 11, wherein the unsupervised classification circuitry, is configured to execute the one or more instructions to generate the preprocessed wafer defect map images by: (i) reducing a spatial dimension for each wafer defect map image in the set of wafer defect map images, and (ii) performing one or more filtering operations to remove non-qualifying wafer defect map images from the set of wafer defect map images.

13. The system of claim 10, wherein the unsupervised classification circuitry is configured to execute one or more instructions to generate the vector representations for the set of wafer defect map images based at least in part by performing a flattening operation on each wafer defect map image in the set of wafer defect map images.

14. The system of claim 10, wherein:
the non-linear dimensionality reduction machine learning model is a Uniform Manifold Approximation and Projection machine learning model; and
the unsupervised classification circuitry is configured to execute the one or more instructions to generate the reduced feature data by performing Uniform Manifold Approximation and Projection on the vector representations for the set of wafer defect map images.

15. The system of claim 10, wherein:
the density-based clustering machine learning model is a Hierarchical Density-Based Spatial Clustering of Applications with Noise (HDBSCAN) machine learning model.

16. The system of claim 10, wherein the unsupervised classification circuitry is configured to execute the one or more instructions to generate the classification prediction for each wafer defect map image by (i) assigning a label to each wafer defect pattern cluster, and (ii) associating the respective wafer defect map image with the label for the wafer defect pattern cluster associated with the respective wafer defect map.

17. The system of claim 10, wherein the unsupervised classification circuitry is configured to execute the one or more instructions to update the wafer defect pattern class corpus by updating a wafer defect pattern class database.

18. The system of claim 10, further comprising:
a supervised classification circuitry, configured to execute one or more instructions to:
train, based at least in part on the updated wafer defect pattern class corpus, a convolutional neural network machine learning model configured to generate classification predictions for wafer defect maps.

* * * * *